US010755528B2

(12) United States Patent
Pilnock et al.

(10) Patent No.: US 10,755,528 B2
(45) Date of Patent: *Aug. 25, 2020

(54) METHOD AND SYSTEM FOR ALLOWING A VOTER TO VOTE VIA AN AUGMENTED REALITY DEVICE ON A REAL WORLD EVENT DISPLAYED ON A VIDEO DISPLAY THAT IS BEING VIEWED BY THE AUGMENTED REALITY DEVICE

(71) Applicant: 8 Bit Development Inc., Mesa, AZ (US)

(72) Inventors: Eric M. Pilnock, Mesa, AZ (US); Kenneth E. Irwin, Jr., Dawsonville, GA (US); Michael T. Day, Mesa, AZ (US); Michael Pilnock, Maricopa, AZ (US); Fred W. Finnerty, Dawsonville, GA (US)

(73) Assignee: 8 Bit Development Inc., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,182

(22) Filed: Mar. 4, 2020

(65) Prior Publication Data

US 2020/0219367 A1 Jul. 9, 2020

Related U.S. Application Data

(62) Division of application No. 16/513,065, filed on Jul. 16, 2019.
(Continued)

(51) Int. Cl.
*A63F 9/00* (2006.01)
*G07F 17/32* (2006.01)
(Continued)

(52) U.S. Cl.
CPC ........ *G07F 17/3288* (2013.01); *G06T 19/006* (2013.01); *G07F 17/3211* (2013.01);
(Continued)

(58) Field of Classification Search
None
See application file for complete search history.

(56) References Cited

U.S. PATENT DOCUMENTS 8,821,274 B2 9/2014 Lyons et al.
9,355,519 B2 5/2016 Lyons et al.
(Continued)

FOREIGN PATENT DOCUMENTS

WO 2016110797 A1 7/2012

OTHER PUBLICATIONS

Understanding Video-based Automatic Content Recognition., Whitepaper published by Samba TV, Sep. 2017, 15 pages.
(Continued)

*Primary Examiner* — Seng H Lim
(74) *Attorney, Agent, or Firm* — Panitch Schwarze Belisario & Nadel LLP

(57) ABSTRACT

Methods and systems are provided for allowing a plurality of players to vote on one of a plurality of real world events being displayed on video displays that are potentially viewable by augmented reality (AR) devices, and monitor progress of the real world events and status of votes on the real world events using the AR devices. Each of the real world events are represented by a respective video feed that becomes displayed on the video displays. The AR devices are pointed at the video displays to identify the real world event.

19 Claims, 31 Drawing Sheets

Related U.S. Application Data

(60) Provisional application No. 62/700,006, filed on Jul. 18, 2018.

(51) Int. Cl.
  H04L 29/06 (2006.01)
  G06T 19/00 (2011.01)

(52) U.S. Cl.
  CPC ...... G07F 17/3223 (2013.01); G07F 17/3241 (2013.01); H04L 67/38 (2013.01)

(56) References Cited

U.S. PATENT DOCUMENTS

| | | |
|---|---|---|
| 9,558,612 B2 | 1/2017 | Lyons et al. |
| 9,659,447 B2 | 5/2017 | Lyons et al. |
| 9,666,021 B2 | 5/2017 | Nguyen |
| 9,697,683 B2 | 7/2017 | Lyons et al. |
| 2011/0065496 A1 | 3/2011 | Gagner et al. |
| 2012/0165101 A1 | 6/2012 | Krishnamoorthy et al. |
| 2012/0184352 A1 | 7/2012 | Detlefsen et al. |
| 2013/0281206 A1 | 10/2013 | Lyons et al. |
| 2013/0281207 A1 | 10/2013 | Lyons et al. |
| 2013/0281208 A1 | 10/2013 | Lyons et al. |
| 2013/0281209 A1 | 10/2013 | Lyons et al. |
| 2013/0303274 A1 | 11/2013 | Gadher et al. |
| 2014/0080590 A1 | 3/2014 | Link et al. |
| 2014/0108309 A1* | 4/2014 | Frank ............... G07C 13/00 706/12 |
| 2014/0302915 A1 | 10/2014 | Lyons et al. |
| 2015/0126279 A1 | 5/2015 | Lyons et al. |
| 2015/0228153 A1 | 8/2015 | Hedrick et al. |
| 2015/0287265 A1 | 10/2015 | Lyons et al. |
| 2016/0019746 A1 | 1/2016 | Lyons et al. |
| 2016/0316242 A1 | 10/2016 | Hirsch et al. |
| 2017/0280113 A1 | 9/2017 | Shatz et al. |
| 2018/0085667 A1 | 3/2018 | Tsutsui |
| 2018/0122179 A1 | 5/2018 | Lyons et al. |
| 2019/0051116 A1 | 2/2019 | Joao |

OTHER PUBLICATIONS

Int'l Search Report and Written Opinion dated Oct. 17, 2019 in Int'l Application No. PCT/US2019/041924.

\* cited by examiner

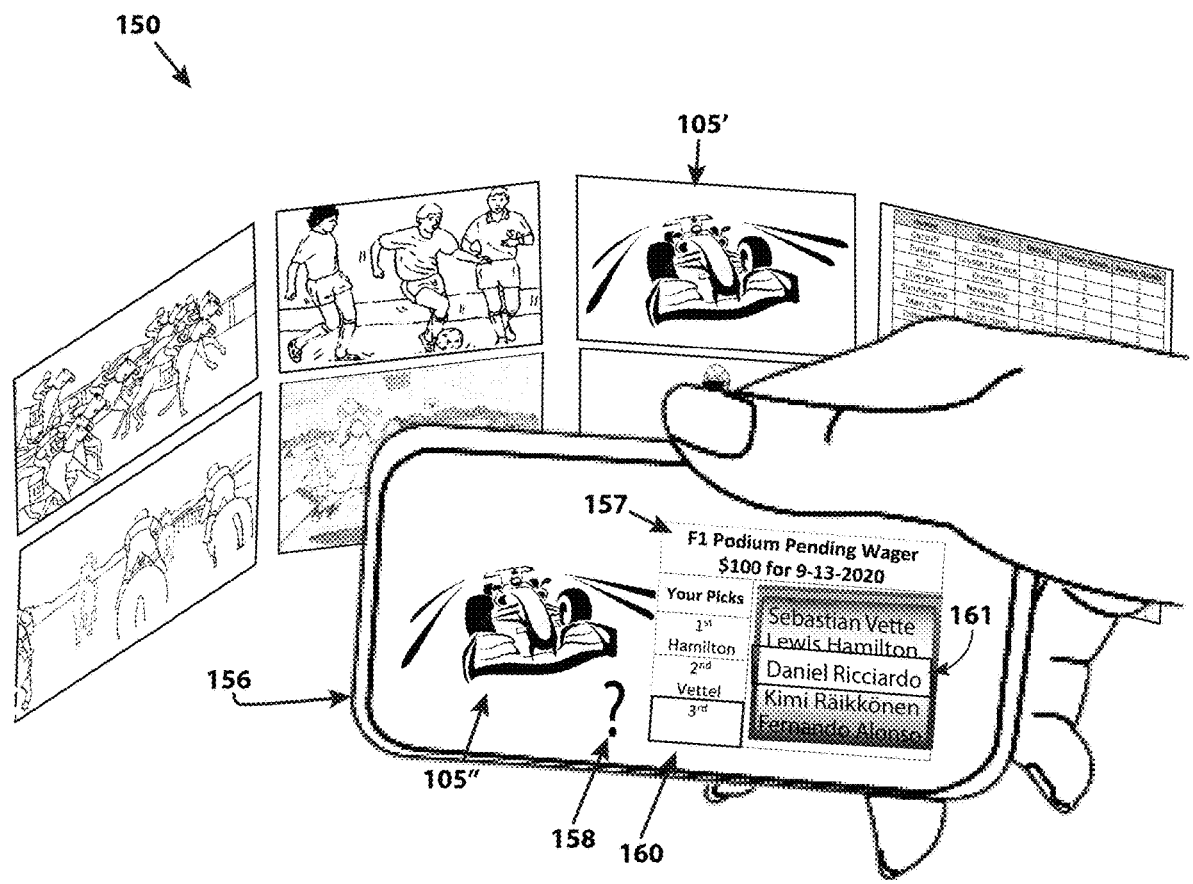
FIG. 1D1

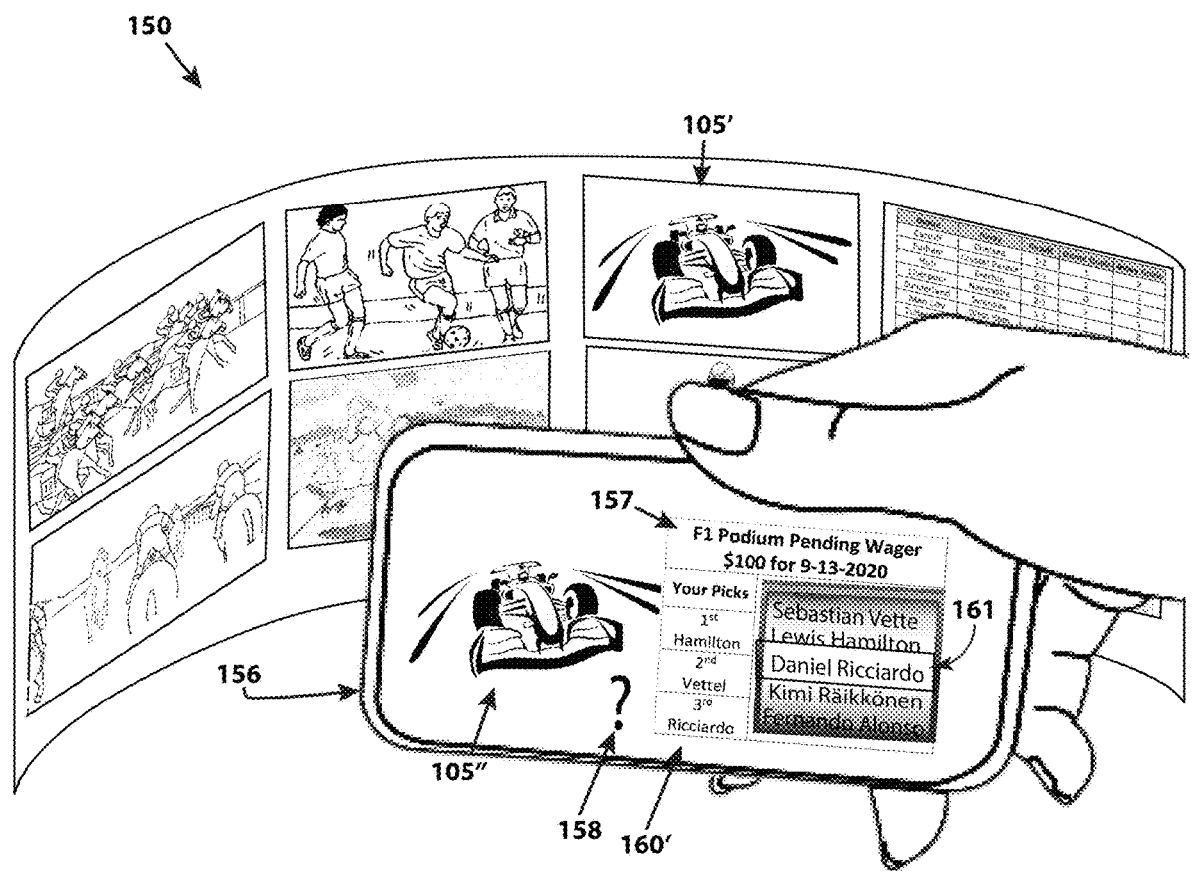
FIG. 1D2

| Home | Away | Result | Home Goals | Away Goals |
|---|---|---|---|---|
| Cardiff | Chelsea | 1-2 | 1 | 2 |
| Fulham | Crystal Palace | 2-2 | 2 | 2 |
| Hull | Everton | 0-2 | 0 | 2 |
| Liverpool | Newcastle | 2-1 | 2 | 1 |
| Sunderland | Swansea | 1-3 | 1 | 3 |
| Man City | West Ham | 2-0 | 2 | 0 |
| Tottenham | Aston Villa | 3-0 | 3 | 0 |
| Norwich | Arsenal | 0-2 | 0 | 2 |
| West Brom | Stoke | 1-2 | 1 | 2 |
| Southampton | Man Utd | 1-1 | 1 | 1 |

METHOD AND SYSTEM FOR ALLOWING A VOTER TO VOTE VIA AN AUGMENTED REALITY DEVICE ON A REAL WORLD EVENT DISPLAYED ON A VIDEO DISPLAY THAT IS BEING VIEWED BY THE AUGMENTED REALITY DEVICE

CROSS-REFERENCE TO RELATED APPLICATIONS

This application is a divisional of copending U.S. application Ser. No. 16/513,065 filed Jul. 16, 2019, the disclosure of which is incorporated by reference herein in its entirety.

This application claims the benefit of U.S. Patent Application No. 62/700,006 filed Jul. 18, 2018, the disclosure of which is incorporated by reference herein in its entirety.

FIELD OF THE INVENTION

The present disclosure relates to a system and method for allowing a plurality of consumers to individually view in real time odds and/or payouts tailored to the specific gaming event (e.g., horse race, football game, Jai alai) that he or she is observing at a given time. Additionally, potential payouts for each individual consumer's wagers already bet can be displayed and updated in real time for gaming events as they progress. This individual customization of both suggested and committed bets or wagers is made possible through Augmented Reality (AR) or Virtual Reality (VR) devices that can both function as independent systems or alternatively as enhancements to existing wagering systems.

BACKGROUND

Wagering on the outcomes of sporting events (e.g., football games, basketball games, horse races, Jai alai), is a large and growing industry in many parts of the world. Recently, in the United States (US) the Supreme Court (i.e., "*Murphy v. National Collegiate Athletic Association*") struck down a 1992 federal law that effectively banned commercial sports betting in most states, opening the door to legalizing the estimated $150 billion in illegal wagers on professional and amateur sports that Americans make every year. With this ruling, bettors will no longer be forced into the black market to use offshore wagering operations or illicit bookies. Placing bets will be now typically done across the US, fueled and endorsed by the lawmakers and sports officials who opposed it for so long. A trip to Las Vegas to wager on March Madness or the Super Bowl could soon seem quaint.

This ruling, in *Murphy v. National Collegiate Athletic Association*, is also probably a boon for media and data companies that have existing relationships with the major sports leagues. They include television networks like ESPN, which is likely to benefit from more fans having a more deeply vested interest in the action, ultimately resulting in higher ratings.

Thus, a nascent industry is emerging in the form of various sports betting. In the past, various types of betting products or systems have been developed for various types of sporting events. These include: parimutuel horse racing "tote boards" displaying if a particular horse will finish first (win), finish in the top two (place), or finish in the top three (show), or alternatively, various combination bets with multiple horses, such as an exacta bet (covering the top two horses in order) or a trifecta bet (covering the top three horses in order); football, basketball, or soccer moneyline, spread, or handicap bets; or various other futures like head-to-head, half betting, in-play betting; etc.

Aside from sports betting, electronic gaming machines such as slot machines, video poker machines, and keno machines are proliferating throughout casinos. In theory these machines feature low intimidation for novice players, although there are numerous new gaming themes that are either being installed in casinos or are in development. However, these types of electronic gaming machines typically share similar ergonomic interfaces and consequently the low intimidation feature for novice players is maintained despite the propagation of new gaming themes.

Consequently, the vast number of sport or event betting options offered coupled with the large number of sporting events and other gaming venues available at any given time is challenging for an experienced gambler much less a novice and accordingly can prove intimidating to anyone. When it is realized that these options will soon be available to areas of the US that have never had access to gambling on sporting events and other gaming venues before, the problem of intimidating consumers contemplating betting is compounded.

Some notable attempts have been made to elevate the problem of betting intimidation—e.g., U.S. Pat. Nos. 8,821,274; 9,355,519; 9,558,612; 9,697,683 (all "Lyons et. al"); and U.S. Pat. No. 9,666,021 ("Nguyen"). However, "Lyons et. al" in its various embodiments only teaches implementing Augmented Reality (AR) aids for Electronic Gaming Machines ("EGMs" a.k.a. slot machines) by offering various gaming enticements (e.g., FIG. 22 of "Lyons et. al" '274 patent) as well as gaming options or information and is silent on other forms of gaming as well as providing updates for games in progress. These same basic concepts are taught in different embodiments in "Nguyen" with some additional ancillary information on the casino layout and various "hot spots." However, like "Lyons et. al", "Nguyen" is completely silent on providing aid to a consumer with any games in progress as well as any form of sports betting.

U. S. Patent Application Publication No. 2011/0065496 ("Ganger et. al") discloses the creation of "fiducial markers" that can enable AR bonus play with electronic gaming machines, but as before is silent on providing help as games progress as well as live video sports betting. Finally, U.S. Patent Application Publication No. 2012/0184352 ("Detlefsen et. al") discloses enabling AR betting at sporting events triggered by signage as well as AR betting on electronic gaming machines, but again is silent on providing help as games progress. Additionally, "Detlefsen et. al" is largely silent on wager funding and cash out methodologies and completely silent on anonymous consumer wagering and cash-out capabilities.

Therefore, in order assist with wager and redemption of the vast number of betting options offered coupled with the large number of sporting events and other gaming venues available, it is highly desirable to develop automated valet systems that assist both novice and experienced consumers with real time wagering of sporting and other gaming events. These automated valet systems are game type independent, thereby offering the greatest utility to consumers and gaming institutions. Ideally, these automated valet systems include seamless funding and cash out sub-systems that support both known and anonymous consumers.

SUMMARY OF THE INVENTION

Objects and advantages of the present invention will be set forth in part in the following description, or may be obvious from the description, or may be learned through practice of the present invention.

In a preferred embodiment, a method and system are provided for an Augmented Reality (AR) device, wherein the device is aware of the consumer's surroundings and creates digital images that appear to be in the consumer's surroundings when viewed through the device that augment the gaming or gambling experience. Thus, with the benefit of this invention, the AR device would (1) scan and assess the consumer's environment; (2) use pattern matching or other recognition software to detect events being displayed elsewhere in the environment including sporting events; (3) identify the events, optionally ranking the events, and determine whether wagers are available to be placed or alternatively, if a wager has already be made by the consumer, provide real time updates as to the status of the wager as the event progresses; and (4) generate persistent digital objects or other interactive objects which allows the consumer to view and manage wagers.

Whenever a wager is made, the AR device interfaces with a central server to commit to the wager if the consumer's account is known and provide a digital receipt and conformation to the consumer's AR device. Optionally, in another embodiment, a paper receipt may be also optionally generated. Otherwise, if the consumer is anonymous to the system, alternative payment venues are provided that will allow the consumer to monetarily commit to the wager nevertheless. Once the wagered event starts, the AR device provides real time updates as to the status of the consumer's wager and optionally allowing the consumer to cancel or otherwise modify their wager (typically, with a discounted payback penalty). Finally, an automated system is provided for the consumer to cash out any winnings.

In an alternative embodiment, a method and system are provided for a Virtual Reality (VR) device, wherein the device creates a virtual surrounding environment simulating a sports betting venue that appear to be in the consumer's surroundings when viewed through the device thereby enabling a gaming or gambling experience in any type of setting. Thus, with the benefit of this invention, the VR device would (1) create a virtual sports betting environment with at least one sporting event displayed; (2) via positioning and optionally gestures, identify a particular event of interest to the consumer, optionally ranking the event, and determine whether wagers are available to be placed or alternatively, if a wager has already be made by the consumer, provide real time updates as to the status of the wager as the event progresses; and (3) generate persistent digital objects or other interactive objects in addition to the sporting display which allows the consumer to view and manage wagers.

Whenever a wager is made, the VR device interfaces with a central server to commit to the wager if the consumer's account is known and provide a digital receipt and conformation to the consumer's VR device. Optionally, in another embodiment, a paper receipt may be also optionally generated. Once the wagered event starts, the VR device will provide real time updates as to the status of the consumer's wager and optionally allows the consumer to cancel or otherwise modify their wager (typically, with a discounted payback penalty). Finally, an automated system is provided for the consumer to cash out any winnings.

Described are mechanisms, systems, and methodologies related to constructing a Valet AR or "VAR" device or, alternatively, a Virtual Reality Valet ("VRV") device gaming systems thereby enabling methods of consumer assisted gaming hitherto unknown. The key innovations are the embedded VAR and/or VRV interactions and services that seamlessly interact with other data systems, thereby enabling consumer friendly high-speed variable and flexible betting.

In a general embodiment, a VAR and/or VRV system is disclosed that provides consumer selectable varying odds and payouts particular to the event that the consumer is viewing in real time that are not available via prior art systems. The variability and flexibility of the present invention is achieved from determining the event the consumer is viewing and interacting with a plurality of various data sources and servers to provide a user friendly, seamless wagering experience. After the wager is committed, the VAR and/or VRV system utilizes the stored wager data as well as the associated real time event updates to provide personalized updates as to the wager's status (e.g., probability of paying off, potential winnings, odds of winning, prior to end of event cash-out options) as well as ultimate win or lose status and payout of prizes won.

As an aspect of this general embodiment, the disclosed VAR and/or VRV gaming system architecture readily accommodates ergonomic consumer wagering and redemption by enabling both known consumer and anonymous consumer play via a plurality of funding and cash-out systems. These funding and cash-out systems allow for both virtual and physical bet tickets. Thus, the consumer only needs to maintain possession of his or her VAR and/or VRV device to make a wager and determine if the wager was a winner and cash-out.

In a specific embodiment, the VAR and/or VRV gaming system enabled by the present invention, provide anonymous consumer wagering and cash-out capabilities. These anonymous wagering and cash-out capabilities are possible since the VAR and/or VRV device(s) and system(s) and/or physical embodiments maintain a record of the wager and functions essentially as a payable on demand token. In another specific embodiment, receipts for wagers made are transferred, both in a virtual and physical embodiment.

In another specific embodiment, the inherent real time game updating capability of this invention enables heretofore unknown new forms of gaming. In yet another specific embodiment, the consumer unique VAR and/or VRV gaming system portal also enables new forms of gaming.

Described are a number of mechanisms and methodologies that provide practical details for reliably implementing a VAR and/or VRV system from commonly available hardware that also provides for scalability. Although the examples provided herein are primarily related to sports betting in casino environments, it is clear that the same methods are applicable to any type of wagering system (e.g., slot machines, table games) in differing locations (e.g., private home, sports bar).

The foregoing Background and Summary, including the description of some embodiments, motivations therefor, and/or advantages thereof, are intended to assist the reader in understanding the present disclosure, and do not in any way limit the scope of any of the claims.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1D1 is a second representative example isometric view of the casino sports betting venue of FIG. 1A with the visual enhancements of a virtual valet system as viewed through an AR device displaying a plurality of betting options partially selected by the consumer that is facilitated by this invention;

FIG. 1D2 is the same second representative example isometric view of the casino sports betting venue of FIG. 1A with the visual enhancements of a virtual valet system as viewed through an AR device of FIG. 1D1 displaying a plurality of betting options completely selected by the consumer that is facilitated by this invention;

FIG. 1H1 is a magnified view of the representative example screens 107 of FIG. 1A;

FIG. 1H2 is a magnified view of the representative example screens 108 of FIG. 1A;

FIG. 2*i* is a schematic diagram representative example of the processes associated with displaying and processing the visual enhancements of a VAR system compatible with the embodiments of FIG. 2G;

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one." The abbreviations "AR" and "VR" denote "Augmented Reality" and "Virtual Reality" respectively. Augmented Reality (AR) is an interactive experience of a real-world environment whose elements are "augmented" by computer-generated perceptual information. While definitions of AR vary depending on the application, in the context of this invention AR denotes constructive (i.e. additive to the natural environment) overlaid visual and possibly audible sensory information seamlessly interwoven into images of the real world. Examples of existing AR platforms are: Apple iPhones®, Android® phones, Google Glass, Microsoft HoloLens, etc. AR augmented computer-generated perceptual information is referred to as "persistent digital objects", or "overlay images", or "visual digital image overlays" interchangeably throughout the specification and claims. In the context of this invention "persistent digital objects", or "overlay images" can be simple two-dimensional overlays of statistics or odds, interactive control panels, or simulated three-dimensional objects. Virtual Reality (VR) is an interactive computer-generated experience taking place completely within a simulated environment. VR as used herein denotes complete immersion into the computer-generated experience with no real world environment admitted and may also include audio. Examples of existing VR platforms include: Oculus, Windows Mixed Reality, Google Daydream, HTC Vive.

In the context of the present invention, the term "VAR" refers to the invention as a "Valet AR" or "Valet Augmented Reality" embodiment where bets are offered to the consumer; bets can be placed on an outcome, the game or event observed; and, depending on the results of the game or event, the winning bets can be paid out all within the "Valet Augmented Reality" ("VAR") ergonomic interface. The term "VRV" refers to "VR Valet" or "Virtual Reality Valet" embodiment, essentially providing a similar ergonomic interface as the "VAR" embodiment, but in virtual reality. A "wager" or "bet" are used interchangeably meaning a gamble on predicting the outcome of a drawing (e.g., sporting event) in the future. Finally, the terms "bettor," "player," or "consumer" all refer to a human individual utilizing the invention.

Before describing the present invention, it may be useful to first provide a brief description of the current state of the art of sports betting and validation as well as the localized nature of the venue. The concept is to ensure that a common lexicon is established of existing systems prior to describing the present invention.

Figure 1A:
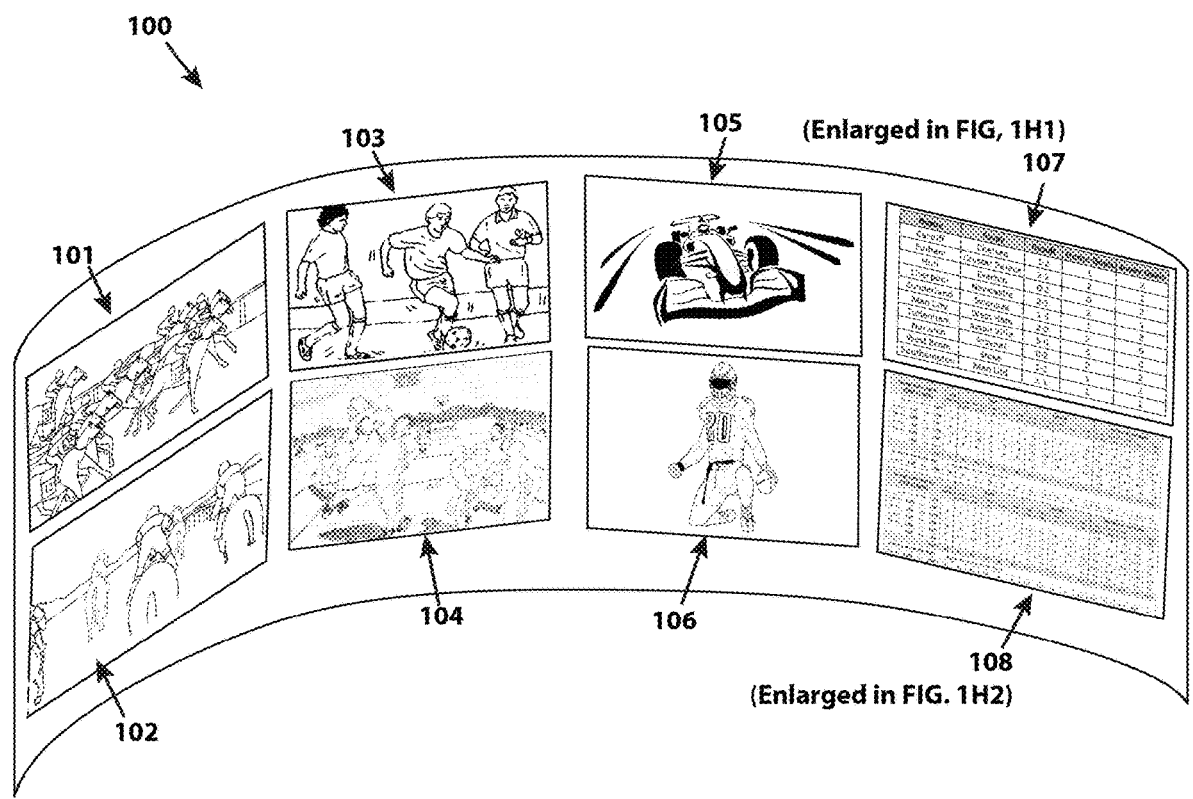
FIG. 1A is a representative example isometric view of a prior art casino sports betting venue.

FIG. 1A is an exemplary view of a typical casino sports betting venue 100. These types of casino sports betting venues are typically confined to large rooms with a plurality of television monitors (101 thru 108) displaying either various live sporting events (101 thru 106) or the betting odds and potential payouts (107 and 108—also illustrated magnified in FIGS. 1H1 and 1H2 respectively) associated with the pending sporting events. Typically, each television monitor is tuned to a different sporting event with each sporting event having its own distinct wagering opportunities. In addition to the plurality of television monitors (101 thru 108), there are also typically a plurality of human operated betting stations (not shown in FIG. 1A) where wagers are accepted and prizes are paid out. Thus, the prior art typical casino sports betting venue 100 is localized to a large room on the casino facility with a high level of intimidation for novice consumers uncertain what betting options are available, how those options would pay out, how to make wagers, and in some cases how to determine if they have won or not.

However, with the benefits of the present disclosure, a VAR and/or VRV system can be offered for virtually all types of sports betting that reduces the intimidation and potential confusion for both novice and experienced consumers desiring to make a bet. The reduced intimidation is primarily derived from the VAR and/or VRV ergonomic user interface offered privately to each individual consumer. The private nature of the VAR and/or VRV ergonomic interface inherently reduces consumer intimidation (e.g., no conscious human will be aware of any individual consumer's mistakes or foibles) as well as offering extremely detailed explanations of potential bets and protocols (e.g., football, basketball, or soccer moneyline, spread, or handicap bets; various other futures like head-to-head, half betting, in-play betting) heretofore unknown in the industry. Additionally, the VAR and particularly the VRV embodiments enable access to complete sports betting capabilities in remote locations outside of casino venues (e.g., home, cruise ships, physical locations of sporting events, sports bars) assuming compliance with local and federal laws. Thus, with this invention, any number of sports bets with differing payouts can be accommodated with a single personalized VAR and/or VRV ergonomic interface enabled with this invention.

Having concluded the discussion of the prior art sports betting venue as compared to the advantages with VAR and/or VRV, detailed embodiments of the present invention will now be disclosed. As will be apparent to one skilled in the art, the present invention overcomes many of the disadvantages of sports betting venues, particularly enabling easier consumer access with greater flexibility in terms of consumer choices, play style, game play, and location.

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Figure 1B:
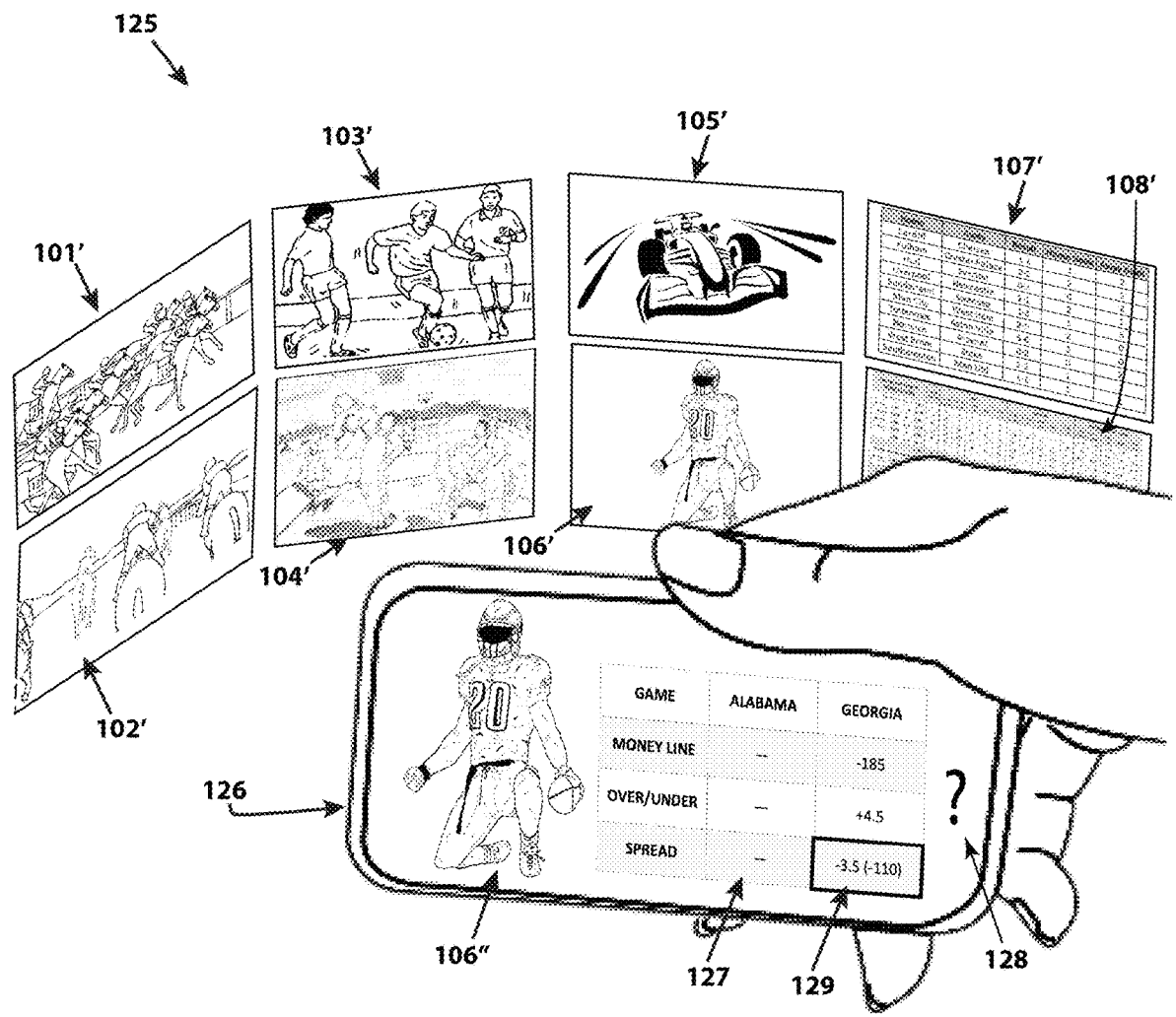
FIG. 1B is a representative example isometric view of the casino sports betting venue of FIG. 1A with the visual enhancements of a virtual valet system as viewed through an AR device displaying a plurality of betting options facilitated by this invention.
Figure 1C:
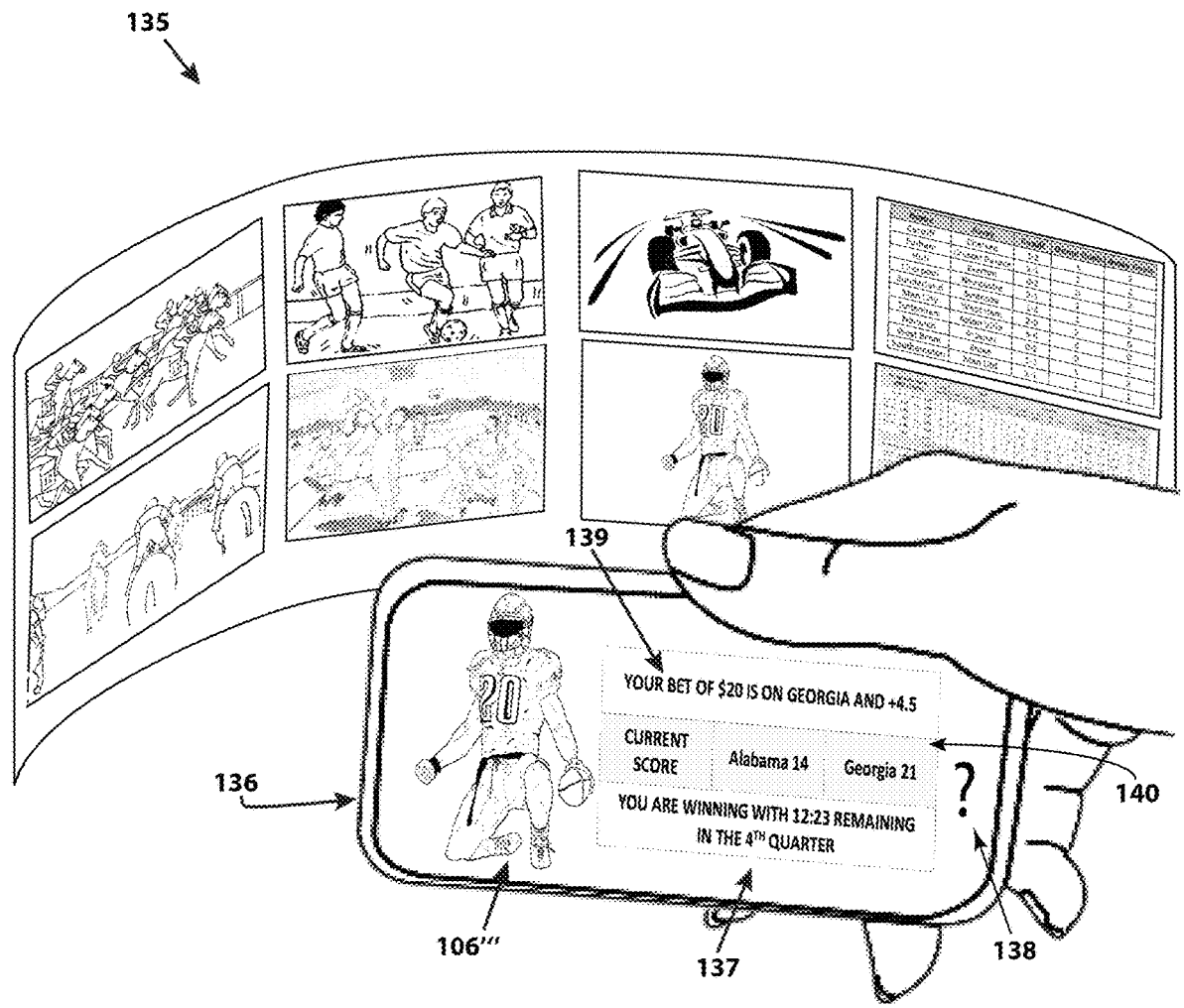
FIG. 1C is a representative example isometric view of the casino sports betting venue of FIGS. 1A and 1B with the visual enhancements of a virtual valet system as viewed through an AR device displaying a plurality of in-play updates facilitated by this invention.

FIGS. 1B and 1C, taken together, illustrate one general embodiment describing a VAR implementation enhancing a traditional sports betting venue in a casino. FIG. 1B illustrates the state of the system at the time a wager is made by a consumer, while FIG. 1C illustrates the state of the same system at the time the sporting event is occurring. While FIGS. 1B and 1C illustrate a VAR embodiment, it is understood that the same fundamental ergonomic interface and system could also be implemented in a VRV embodiment with the VRV embodiment having the advantage of geographic diversity—i.e., not necessarily functioning at the physical casino sports betting venue or in the presence of a television display screen.

In the exemplary system 125 of FIG. 1B the VAR device 126 (e.g., smart phone) captures the live football game preshow video feed displayed on television monitor 106' with its internal camera. The captured video feed video 106" is selected by being in the field of view of the VAR device's 126 camera (not shown). That is, none of the video feeds in any of the other monitors 101' thru 105' as well as statistics 107' and 108' are in the field of view of the VAR device's 126 camera. In addition to the live captured video 106", augmented reality overlays 127 and 128 are superimposed on the VAR device's 126 display screen. As illustrated in this example 125, a portion of the augmented reality overlay 127 displays the current odds and structures for three different types of bets for the pending Alabama verses Georgia football game i.e., "Money Line," "Over/Under," and "Spread." In addition to current odds and structures, the VAR device's 126 display screen also includes an augmented reality virtual help button 128. Hence, with the benefits of this invention, the consumer simply points their VAR device's 126 at the sporting event of interest and immediately sees the current odds and bet structures available for the specific sporting event or game of interest. To make a wager, the consumer merely actuates the appropriate bet 129 (e.g., tap on the portion of the VAR screen displaying the bet of interest, while the VAR device is focused on the game or event of interest—as illustrated in FIG. 1B, the bet would be "Georgia must win by at least four points") with the wager being automatically recorded and paid for from a preestablished account (assuming the consumer is known to the system) or the pending wager logged with an unique serial number (assuming the consumer is not known to the system) that will be finalized if the consumer funds the wager before the designated event's "no more bets" period begins.

By itself, the previously disclosed ergonomic VAR interface enabled by this exemplary embodiment would greatly reduce the intimidation of novice consumers when first approaching sports betting venues as well as potentially eliminate transcription errors for more experienced consumers (e.g., assume the wrong spread for a given game due to misreading the odds display). Yet, with the addition of various nested help modes 128 embedded into the VAR ergonomic system, the novice and experienced consumer can divine the answers to whatever level of detail he or she would want to know about the potential bets available via their own private interactions. For example, the previous records of the two teams playing each other could be queried, or any news concerning the teams (e.g., a quarterback recently hurt in practice) can be displayed, or detailed descriptions of the potential bets can be provided—e.g., "Money Line" (i.e., the selected team "Georgia" wins outright with the amount a player must wager "$185" in order to win $100), "Over/Under" (i.e., a bet on whether the combined score of the pending game will be above or below an a priori number "4.5"), and "Spread" (i.e., a bet where the pay-off is based on whether one team defeats the other by a greater than or equal to a priori margin "3.5," rather than a simple "win or lose" outcome).

Once the wager is made, the ergonomic features of the VAR system continue with support and updates as the game or event plays out as shown in FIG. 1C. In this exemplary embodiment 135, the VAR device's 136 field of view is still focused 106''' on the same football game as illustrated in FIG. 1B, but now the game is in progress with the consumer having already wagered $20 on "Georgia" and "+4.5" (i.e., Georgia must win by a score greater than 4.5 points for the wager to pay off) 139. At this point in time in the game ("12:23" remaining in the "4$^{th}$ Quarter" 137), the consumer is winning the wager with the actual score 140 "Alabama 14" and "Georgia 21". Thus, as enabled by this invention, even a novice consumer can readily understand the status of their wager(s) in real time by simply placing the desired event in the field of view of their VAR device 136. As before, the ergonomic help interface 138 would also be available during the game or event's play with detailed explanations of the current status and other ancillary information readily available.

The benefits of the VAR device are not limited to one or two sporting events or wagers. In a preferred embodiment, the sports betting venue typically includes a plurality of television monitors with each television monitor displaying a different sporting or gaming event (e.g., 101 thru 106 of FIG. 1A) with each sporting or gaming event having its own discrete wagering structure plus related odds and payoffs. In this preferred embodiment, the consumer simply points his or her VAR device at any one of the plurality of television monitors with the VAR device automatically displaying the correct wagering structure (for sporting of gaming events where no wager has been made by the consumer and bets can still be accepted) or updates (for games or events in progress where the consumer has also made a wager) as soon as the one television monitor is identified in the VAR device's field of view. Correspondingly, the VAR device will support any realistic number of wagers the consumer wishes to make or monitor simultaneously.

Figure 1E:
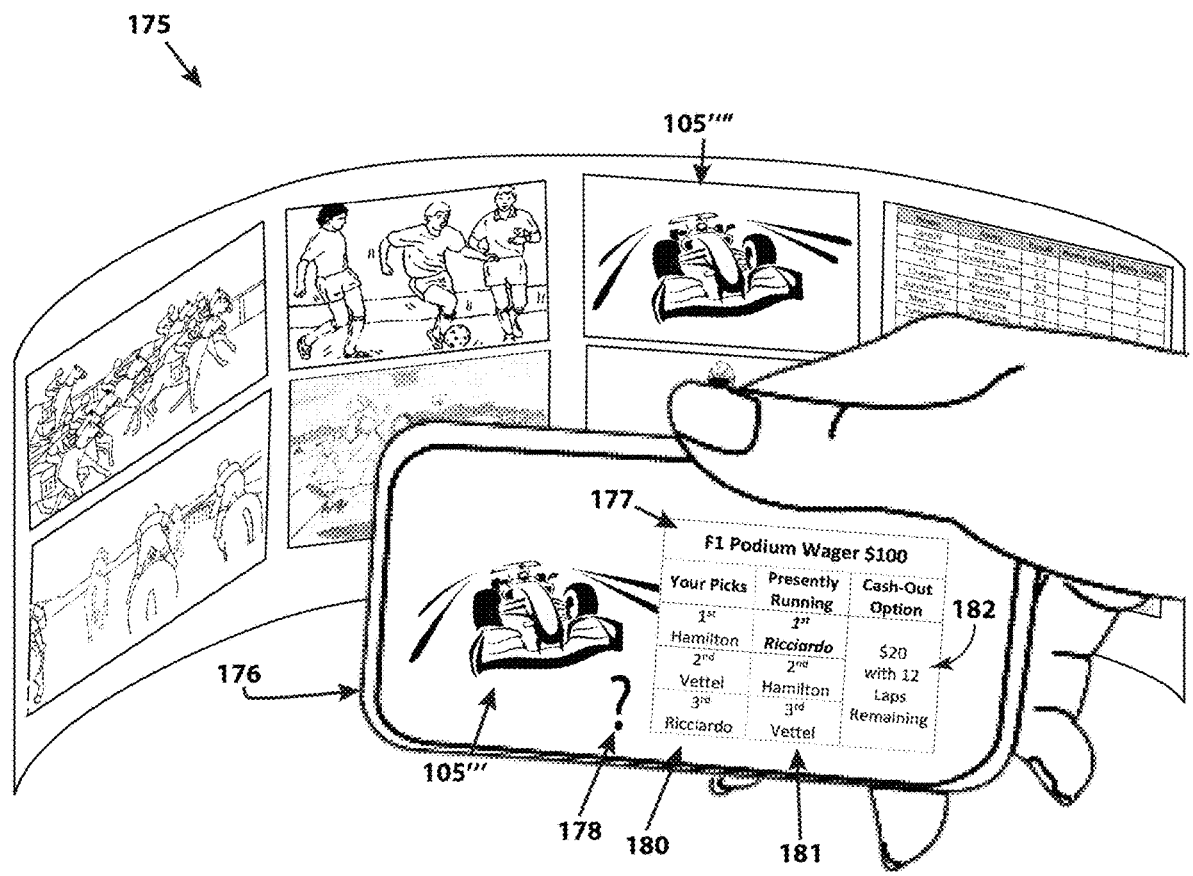
FIG. 1E is a representative example isometric view of a casino sports betting venue of FIGS. 1A, 1D1, and 1D2 with the visual enhancements of a virtual valet system as viewed through an AR device displaying a plurality of in-play updates and options after a wager was made (FIGS. 1D1 and 1D2) facilitated by this invention.

FIGS. 1D1, 1D2, and 1E, taken together, illustrate a second embodiment describing a VAR implementation enhancing a traditional sports betting venue in a casino. FIGS. 1D1 and 1D2 illustrate the state of the system at the time a wager is made by a consumer while FIG. 1E illustrates the state of the same system at the time the sporting event is occurring. While FIGS. 1D1, 1D2, and 1E illustrate a VAR embodiment, it is understood the that same fundamental ergonomic interface and system could also be implemented in a VRV embodiment with the VRV embodiment having the advantage of geographic diversity—i.e., not necessarily functioning at the physical casino sports betting venue or in front of a television feed.

In the exemplary system 150 of FIG. 1D1 the VAR device 156 (e.g., smart phone) captures the Formula One preshow video feed displayed on television monitor 105' with its internal camera. The captured video feed video 105" is selected by being in the field of view of the VAR device's 156 camera (not shown in FIG. 1D1). In addition to the live captured video 105", augmented reality overlays 158 and 160 are superimposed on the VAR device's 156 display screen as a "first digital overlay." As illustrated in this example 150, a portion of the augmented reality overlay 160 displays a pending podium wager 157 selected by the consumer with the consumer betting "$100" that the finish podium for the race scheduled for Sep. 13, 2020 will be "Hamilton" and "Vettel" with the third place on the podium not yet selected. As illustrated in FIG. 1D2, the consumer utilized a virtual "select wheel" 161 to choose his or her driver selections for the final position on the podium ("Ricciardo"), thereby completely defining the bet as "Hamilton," "Vettel," and "Ricciardo" in that order—i.e., first, second, and third 160'. Alternatively, the consumer selection and pending bets could be displayed on two or more consecutive first digital overlays. Thus, the scope of the "first digital overlay" covers both embodiments, namely, a digital overlay that simultaneously displays possible/available wagers and provides an interactive display to enter wagers, or consecutively appearing digital overlays that first displays possible/available wagers, and then provides the interactive display to enter the wagers. Again, with the benefits of this invention, the consumer simply points their VAR device's 156 at the sporting event of interest and immediately has the ability to make a wager automatically recorded and paid for from a preestablished account (assuming the consumer is known to the system) or have the pending wager logged with a unique serial number (assuming the consumer is not known to the system) that will be finalized if the consumer funds the wager before the designated event's "no more bets" period begins.

Once the wager is made, the ergonomic features of the VAR system continue with support and updates as the game or event plays out as shown in FIG. 1E with a "second digital overlay." In this exemplary embodiment 175, the VAR device's 176 field of view is still focused 105' "on the Formula One race now in progress 105" where the consumer has already wagered $100 on the final podium winners 177 arrangement. Specifically, the consumer has wagered 180 that the final podium will be "Hamilton" in first place, "Vettel" in second place, and "Ricciardo" in third. However, as the race is presently unfolding 181 the podium would be arranged "Ricciardo" in first place, "Hamilton" in second place, and "Vettel" in third place, assuming nothing changes between the present time and the end of the race. Consequently, the VAR system is offering the consumer a "Cash-Out Option" 182 of paying back $20 of the $100 wagered if the consumer agrees to terminate the wager at this point in time (i.e., "12 laps remaining"). If the consumer does not elect to actuate the "Cash-Out Option" 182 and the race ends in the presently running order 181, he or she will receive nothing and lose the entire $100. Of course, the amount of money offered in the "Cash-Out Option" 182 will vary depending on how accurate the consumer's pending bet is at the time and how close the event is to ending e.g., if the consumer had wagered "Ricciardo" in first place, "Hamilton" in second place, and "Vettel" in third place the "Cash-Out Option" value may be $140 since an outright win would reimburse the consumer 195% or $195 for their $100 wagered. As before, the ergonomic help interface 178 would also be available during the game or event's play with detailed explanations of the current status and other ancillary information readily available.

As is apparent to those skilled in the art, this type of "Cash-Out Option" is typically not available in sports or event betting venues. Displaying the myriad of potential "Cash-Out Options" available on a continuous basis to the plurality of consumers across a multiplicity of events is virtually logistically impossible using prior art technology. Therefore, aside from the benefits of reducing the intimidation and potential confusion for both novice and experienced consumers desiring to make a bet, the present invention also enables new forms of wagering.

For example, another new form of wagering enabled by the present invention is to enable "Catastrophic Gambler's Insurance" for sports or other VAR or VRV forms of wagering. Catastrophic Gambler's Insurance was originally invented by David Sklansky (see *"Ducy? Exploits, Advice, and Ideas of the Renowned Strategist"* by David Sklansky and Alan Schoonmaker, copyright © 2010 by Two Plus Two Publishing LLC). It is a unique supplemental form of gaming that combines both math and psychology by essentially ensuring a consumer's minimum amount of bets and a subsequently chance to win more money while simultaneously increasing the casino's average profits. The concept essentially guarantees that a consumer cannot lose more than an a priori maximum amount if he or she wagers a minimum amount a minimum number of times. For instance, assume a consumer has $550 to wager on point spread football games. With prior art betting, the consumer would wager on five games $110 each to win a potential $100 for each game with a maximum possible winnings of $500. However, with Catastrophic Gambler's Insurance enabled by the custom individual consumer portals in VAR and VRV embodiments of this invention, the consumer could bet on ten games only risking the same $550 resulting in a maximum possible winnings of $1,000—i.e., any loss above $550 would be forgiven. Catastrophic Gambler's Insurance enables this type of betting because it is essentially insuring against a "Black Swan" event (i.e., disproportionate role of high-profile, hard-to-predict, and rare events that are beyond the realm of normal expectations—e.g., >2σ events), for the casino to lose money in this example the consumer would have to win fewer than three games which would occur only approximately 6% of the time costing the casino around $10 in Expected Value or "EV." However, the subsequent increase in betting volume from five games to ten games wagered increases the overall EV to the casino by $25, such that offering Catastrophic Gambler's Insurance effectively nets the casino an extra $15 in profit on average.

One reason that Catastrophic Gambler's Insurance has not been typically implemented in prior art wagering systems, is that the insurance either requires the consumer to obligate himself or herself at one time for a larger amount wagered or the betting history of the consumer must be tracked over pluralities of individual wagers, thereby ensuring that the minimum number of qualifying bets were made to qualify for Catastrophic Gambler's Insurance. Arguably, with player loyalty programs some form of Catastrophic Gambler's Insurance will be implemented in the future but obtaining the insurance would still remain problematic for casual or anonymous betting consumers. Fortunately, since VAR and VRV embodiments of this invention enable custom individual consumer wagering portals, tracking of the number and types of bets per portal required to obtain Catastrophic Gambler's Insurance becomes computationally trivial. Since every wager by an individual consumer is made through the same VAR or VRV device, the application on the device and the valet betting system (e.g., 282 of FIG. 2D) can both maintain running totals, automatically offering Catastrophic Gambler's Insurance if X number of additional bets are made within some predefined time period—e.g., in the previous example of Catastrophic Gambler's Insurance, if the consumer has already wagered $550 on five football games a popup display may appear on the VAR or VRV device offering to limit the consumer's total losses to $550 assuming he or she wagers on five additional games. Anonymous tracking of the consumer's progressive betting is achieved by monitoring the wagers placed through the VAR or VRV device's betting portal by both the local application and the valet betting system with unique periodic "tracking tags" issued to each VAR or VRV device when the first wager is made. Thus, the tally of total bets and bet types could be readily maintained by both the VAR or VRV device locally as well as on the valet betting system (e.g., maintained on the Bet and Other Data Storage database 216, 249, 272, and 287 on FIGS. 2A thru 2D respectively). To protect against potential hacking frauds from illicit consumers, the assigned tracking tags may be registered with unique identifiers associated with the VAR or VRV device (e.g., Media Access Control or "Mac" address, Burned-In Address or "BIA", Unique Identifier or "UID"). Additionally, the tracking tag may be modified each time the VAR or VRV device communicates with the system via a known algorithm (e.g., Linear Congruential Generator or "LCG", Mersenne twister). The combination of unique periodic tags coordinated with VAR or VRV device unique identifiers is extremely difficult to fake by an outside hacker.

Figure 1F:
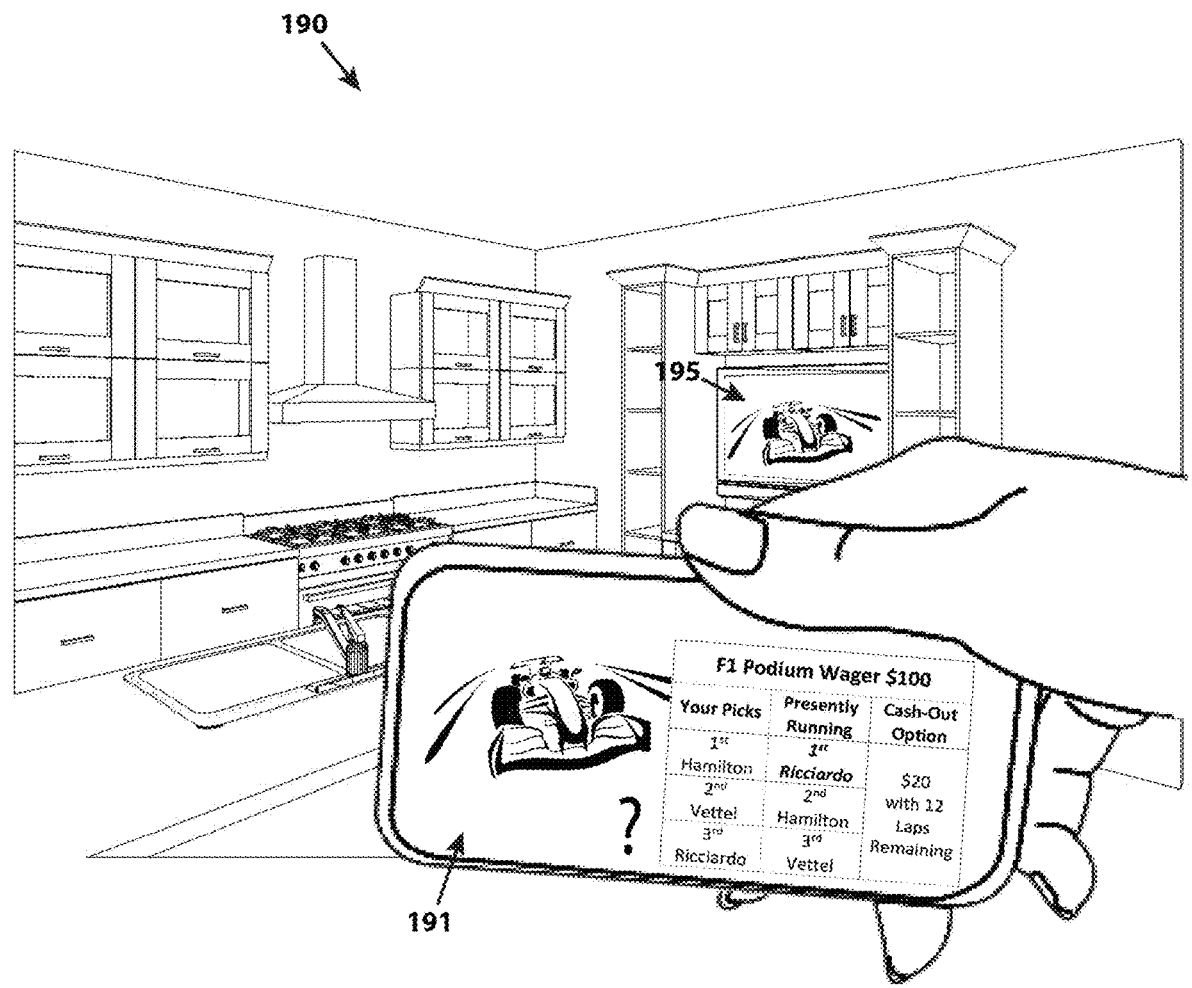
FIG. 1F is a representative example isometric view of a home television (i.e., not within a casino) broadcast of the second representative example of FIG. 1E with the visual enhancements of a virtual valet system as viewed through an AR device displaying a plurality of in-play updates and options after a wager was made (FIGS. 1D1 and 1D2) facilitated by this invention.
Figure 1G:
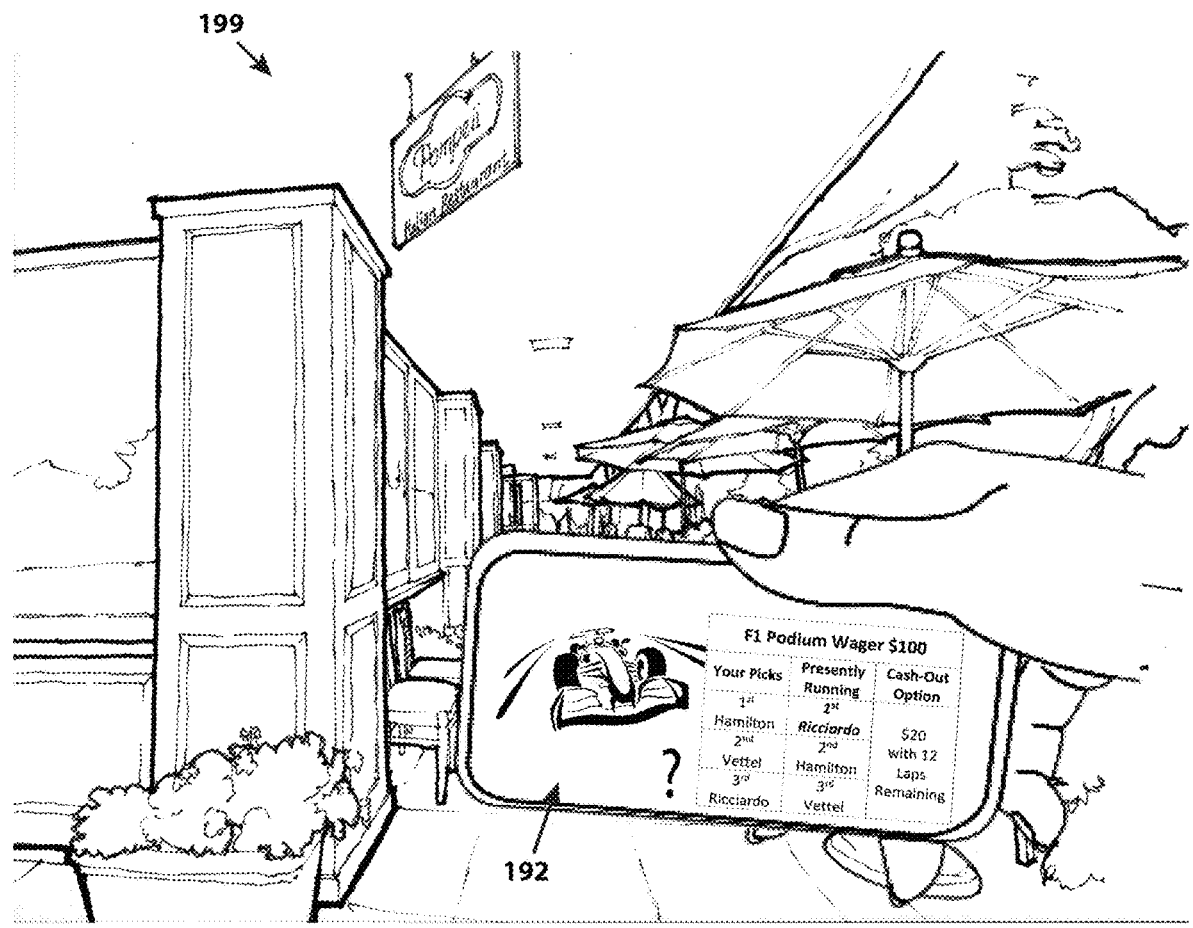
FIG. 1G is a representative example isometric view of the second representative example of FIG. 1E with the television broadcast handed off to the AR device itself with the visual enhancements of a virtual valet system as viewed through an AR device displaying a plurality of in-play updates and options after a wager was made superimposed on top of the television broadcast video feed as facilitated by this invention.
Figure 1H2:
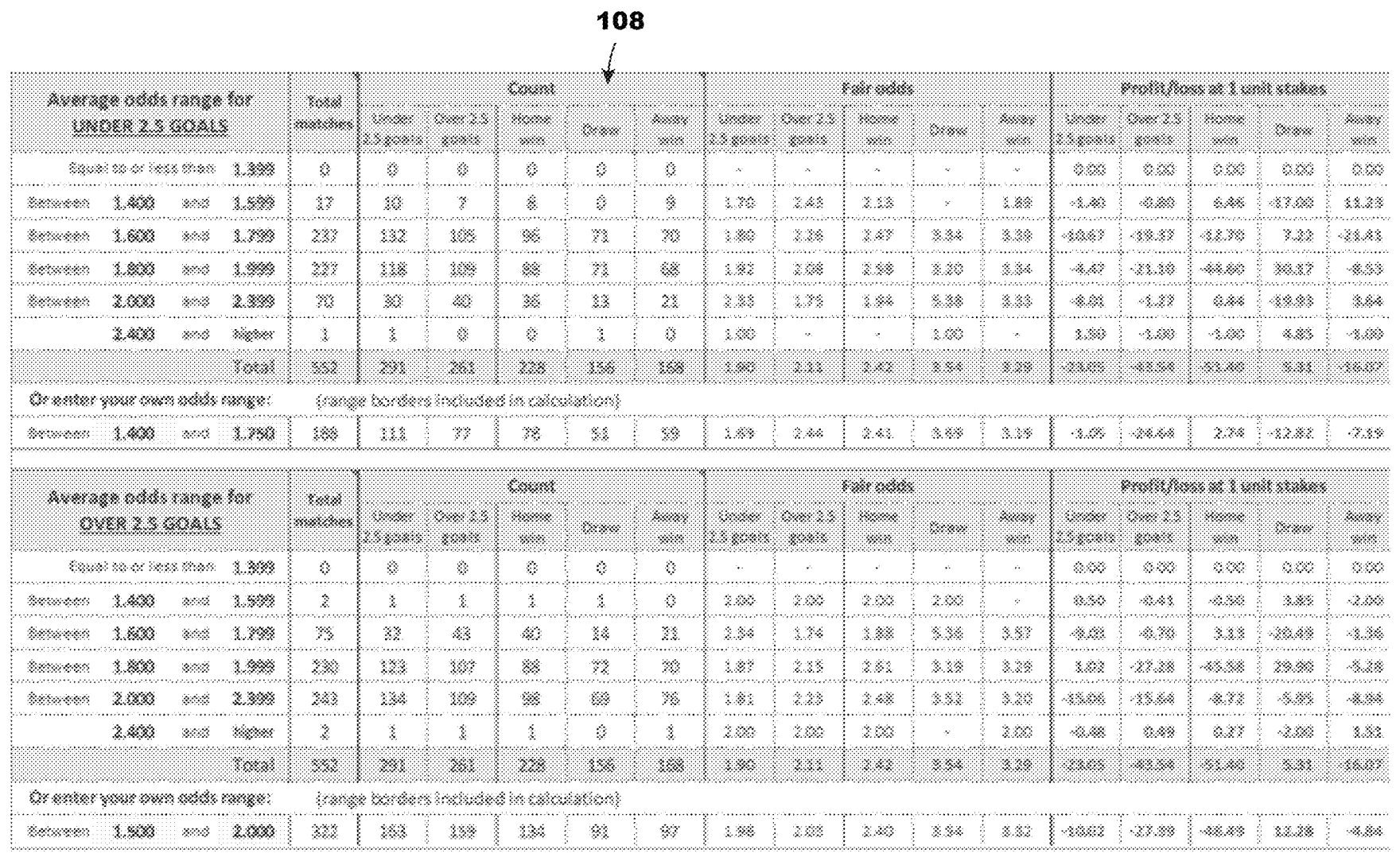
Figure 1I:
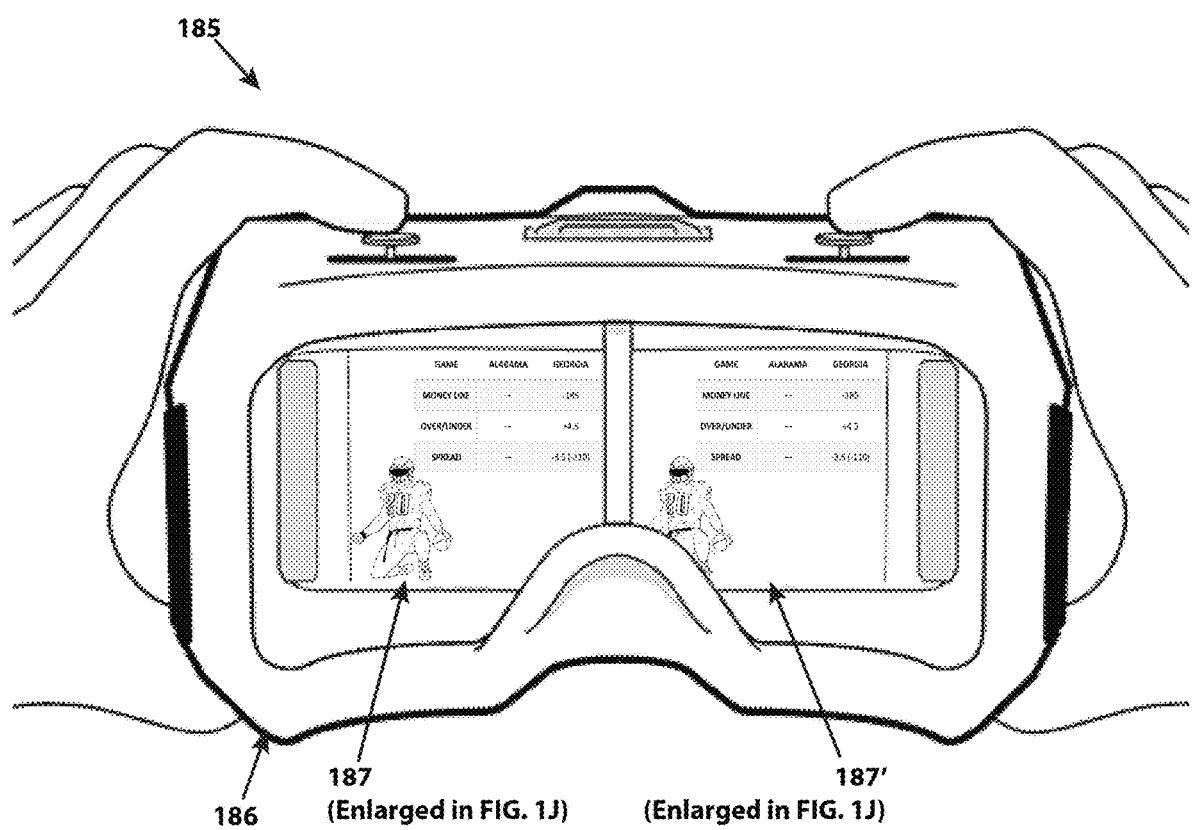
FIG. 1I is a representative example isometric view of the casino sports betting venue of FIG. 1A displayed in a virtual environment including the visual enhancements of a virtual valet system as viewed through an VR device displaying a plurality of betting options facilitated by this invention.
Figure 1J:
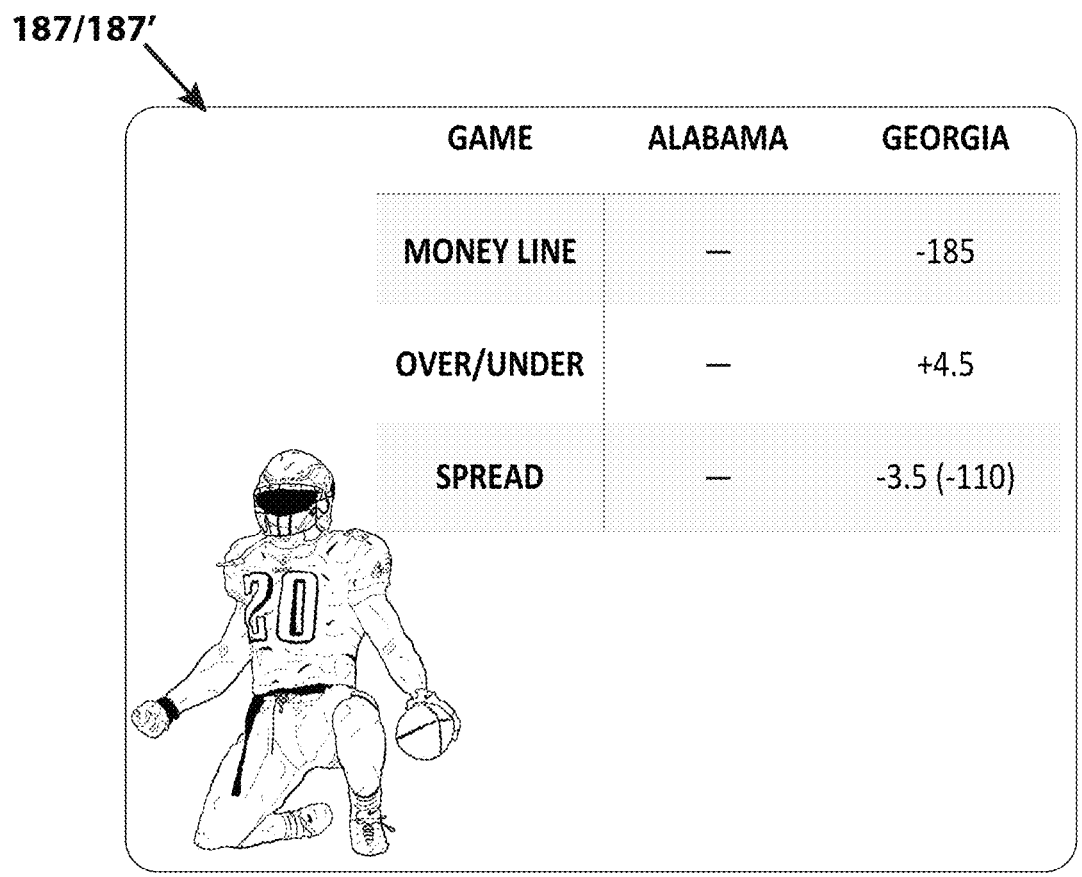
FIG. 1J is a magnified view of the representative example screens 187 and 187' of FIG. 1I.

Similar to the various VAR embodiments previously disclosed, FIG. 1I illustrates an exemplary VRV system 185 providing comparable functionality with a VRV device 186 displaying a live football game preshow video feed in simulated three-dimensional 187 and 187' with augmented reality overlays superimposed. As illustrated in this example 185, a portion of the augmented reality overlay displays the current odds and structures for three different types of bets for the pending Alabama verses Georgia football game (i.e., "Money Line," "Over/Under," and "Spread")—187 and 187' are also illustrated magnified in FIG. 1J. The wagering, querying, and cash out functions with this VRV embodiment are virtually identical to the VAR device (e.g., hand motions replace physical tapping) and will not be repeated here for the sake of brevity.

Of course, the VAR and VRV embodiments are not only applicable to live sports, virtual sports, or casino betting application, the same disclosed technology can be utilized by other gaming environments. For example, VAR embodiments augmenting lottery drawings can reduce or eliminate consumer confusion while possibly attracting younger clientele who, to date, do not appear to be purchasing as many lottery products as older customers.

Figure 1K:
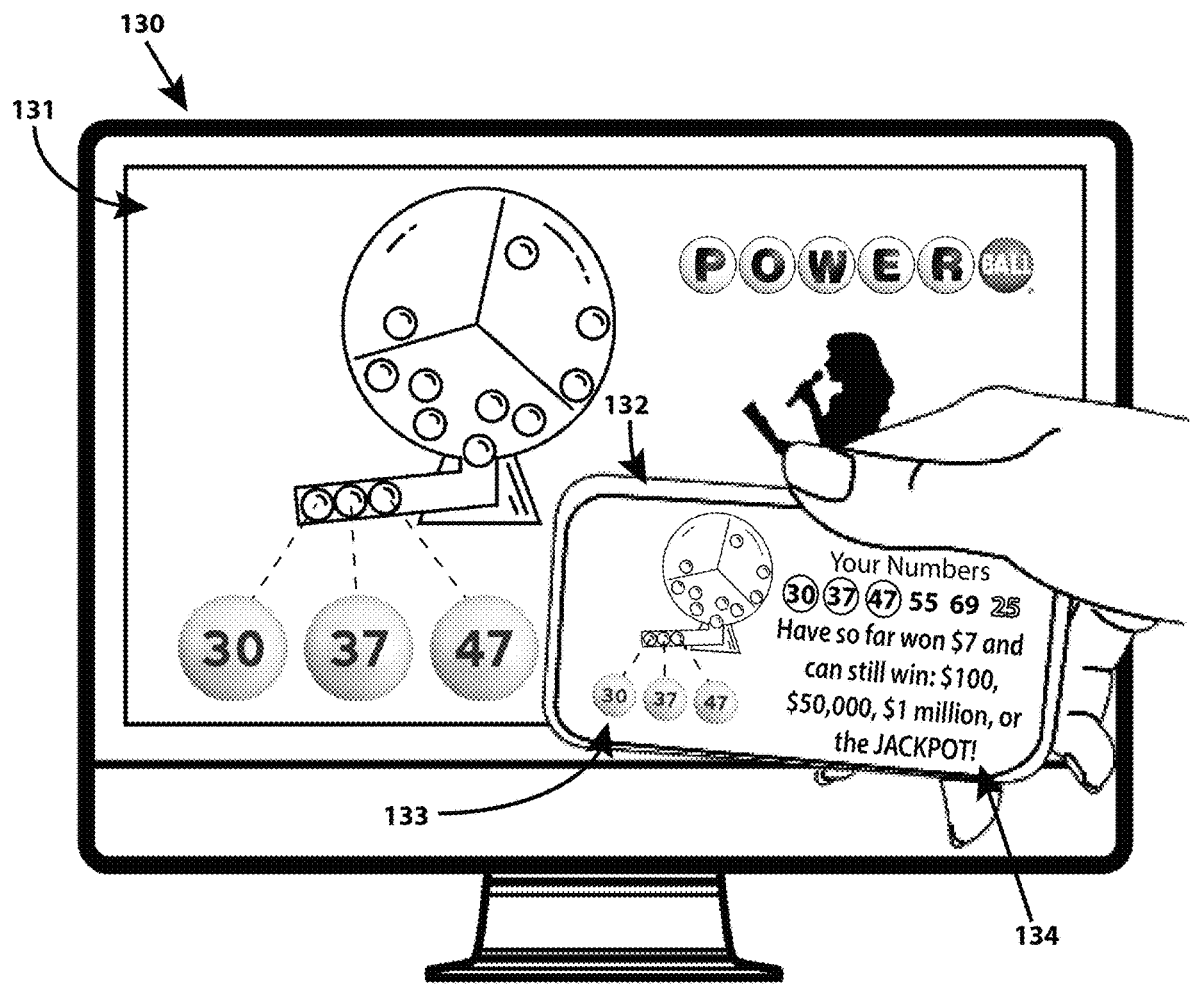
FIG. 1K is a representative example isometric view of a home television (i.e., not within a casino) broadcast of a representative example of a televised Lotto or Powerball drawing with the visual enhancements of a virtual valet system as viewed through an AR device displaying a plurality updates and options after a wager was made facilitated by this invention.

FIG. 1K illustrates an exemplary televised Powerball® lottery drawing 130 on a home flat screen television set 131. As is typical with lottery style drawings, in example 130 the winning numbers are selected from a ping pong ball draw machine with the winning numbers drawn in sequence. While this format has been a mainstay of lottery drawings for decades, many potential consumers find it boring and confusing. This is primarily because consumers are attracted to lottery lotto style drawings for the jackpot prize and some are not even aware of the lesser prizes (e.g., with Powerball it is possible to win $1,000,000 by matching all five "white ball" numbers and still not win the jackpot if the colored "Powerball" number was not selected) with the consequence that most lottery consumer viewers realize they cannot win the jackpot after the first ball is drawn and therefore lose interest. However, with the benefits inherent in a VAR enhancement, a televised lottery drawing 131 can be revitalized with the consumer being enabled to bet remotely and be informed of the significance of each ball drawn thereby avoiding confusion and possibly attracting new consumers. As shown in FIG. 1K, the ongoing Powerball drawing 131 is enhanced for the consumer with a VAR device 132 providing real time updates as to the status of the consumer's bet relative to the drawing as a second digital overlay. In this exemplary embodiment 130, the consumer's Powerball bet could have been previously recorded by the VAR device 132 by scanning the barcode on the consumer's purchased Powerball ticket, or manually keying in the Powerball ticket's serial number, or entered by the VAR device itself. Regardless of how the VAR device 132 became cognizant of the consumer's bet, the VAR device 132 would augment the drawing experience by first capturing images of the televised drawing 131 forwarding the captured images as well as optionally meta data to a separate VAR server for further processing. At the VAR server, the captured images are first processed to identify the specific televised real world video drawing and also generate at least one constructive visual digital image object associated with the real world video feed. The VAR sever or the VAR device 132 overlays the constructive visual digital image object on a portion of the televised real world drawing video image resulting in a composite image (133 and 134) displayed on the VAR device 132 screen. The resulting composite display thus being comprise of at least a portion of the televised drawing 133 and the constructive visual digital image 134.

In the exemplary embodiment 130 of FIG. 1K, the constructive overlay 134 provides real time updates as to the status of the consumer's bet relative to the live televised real world drawing. Accordingly, in this exemplary embodiment 130, the consumer receives personalized bet updates in real time thereby enhancing suspense and the viewing process. Of course, the lottery exemplary embodiment 130 constructive overlay 134 could be enhanced to allow the consumer to interact with the VAR device 132—e.g., deposit winnings into an account, bet the same or different numbers on a future drawing, subscribe to multiple drawings, interact with a Near Field Communications ("NFC") credit or debit card.

Figure 1L:
FIG. 1L is a representative example isometric view of a prior art television show that features audience interaction.
Figure 1M:
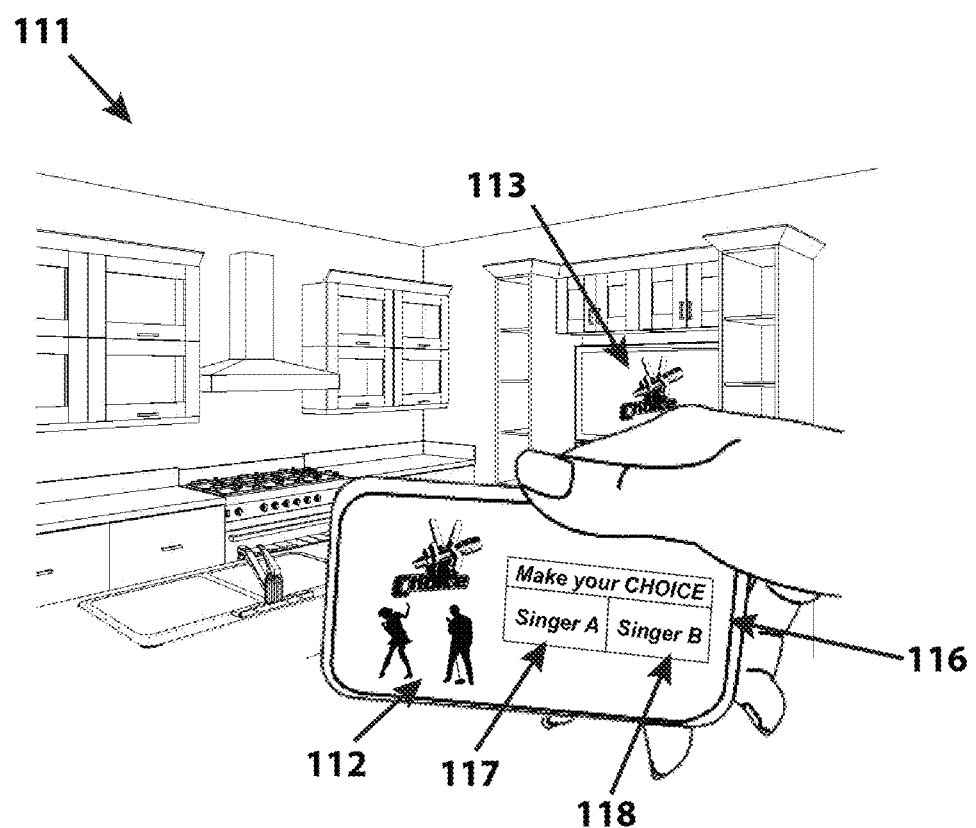
FIG. 1M is a representative example isometric view of a home television broadcast of the representative example of FIG. 1L with the visual enhancements of a virtual valet system as viewed through an AR device.
Figure 1N:
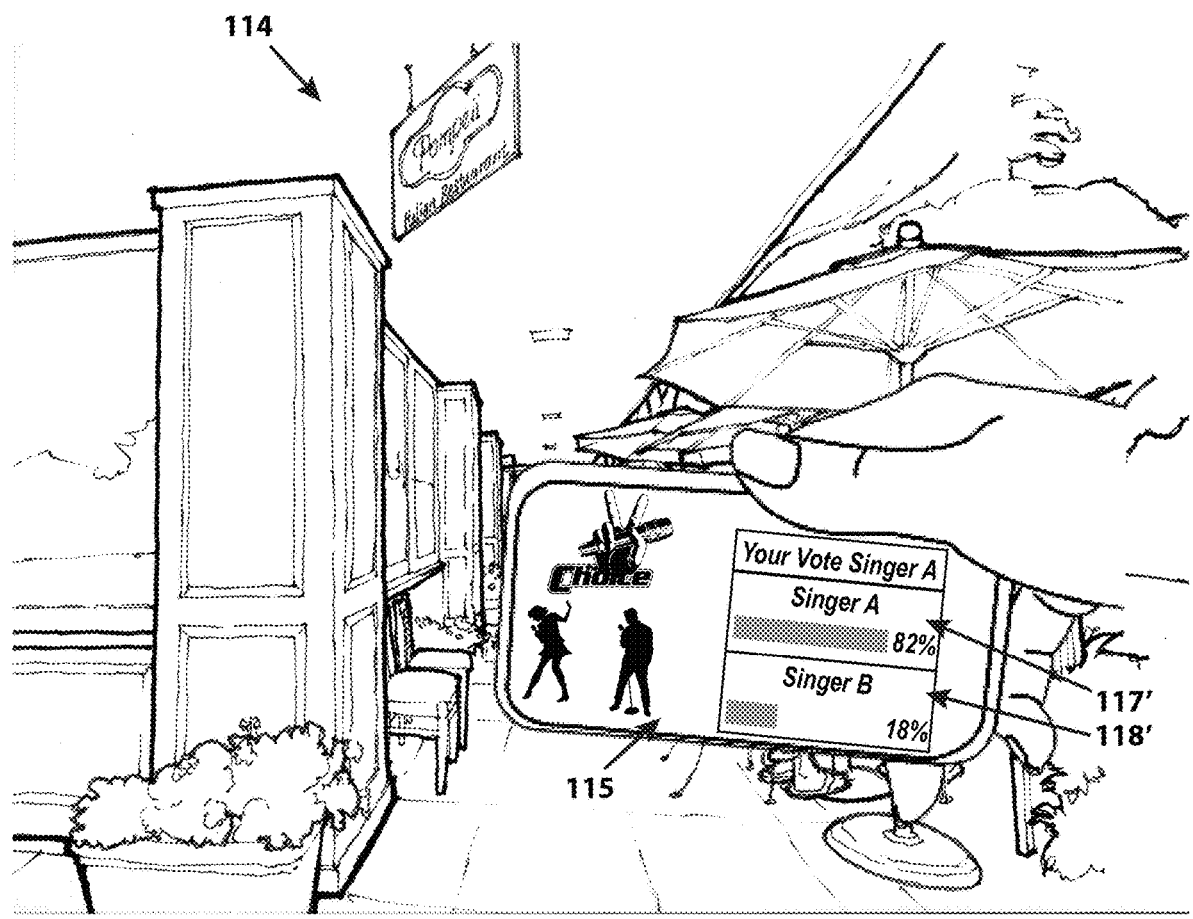
FIG. 1N is a representative example isometric view of the representative example of FIG. 1L with the television broadcast handed off to the AR device itself with the visual enhancements of a virtual valet system as viewed through an AR device functioning as an independent video display.

As is apparent to one skilled in the art, both the VAR and VRV embodiments are not necessarily restricted to betting environments, the same disclosed technology and systems can be applied to other interactive venues, such as live sporting event statistics, automated purchasing of a product advertised on television, subscribing to a premium television subscription service, audience feedback in non-wagering environments, etc. For example, FIG. 1L provides a representative example 110 of a prior art non-gambling-oriented television show that features audience interaction wherein various amateur singers advance in the show based on live audience votes—i.e., "The Choice." In the exemplary embodiment 111 illustration of FIG. 1M, the VAR Device 112 is deployed in a home environment detecting a live television broadcast 113 of the exemplary "The Choice" 110 prior art non-gambling-oriented television program of FIG. 1L in which the VAR device 112 has already identified the "The Choice" 110 program and correspondingly the VAR device 112 has superimposed an augmented reality overlay 116 on the VAR device's 112 display screen along with the "The Choice" 110 television program. Similar to the gambling embodiments, the VAR device 112 superimposed first digital overlay 116 including virtual buttons 117 and 118 that allow the consumer to vote for which singer (i.e., "Singer A" 117 or "Singer B" 118) she would like to advance in the show. Once the selection is made by the consumer, the vote would be transmitted to the associated television program's server in a manner comparable to gambling embodiments. In an alternative exemplary embodiment, once the television program has been identified (e.g., "The Choice") by the consumer's VAR Device it can optionally elect to receive an external video feed directly, thereby freeing the consumer from having to continuously hold the VAR device. For example, FIG. 1N illustrates a VAR device 115 operating in handoff mode on a city street 114. In the example of FIG. 1N, the VAR device is shown displaying a superimposed second digital overlay typical for providing updates after the consumer's vote is cast, showing how the percentage of votes the consumer's selected singer 117' is garnering relative to the competition 118'.

Figure 2A:
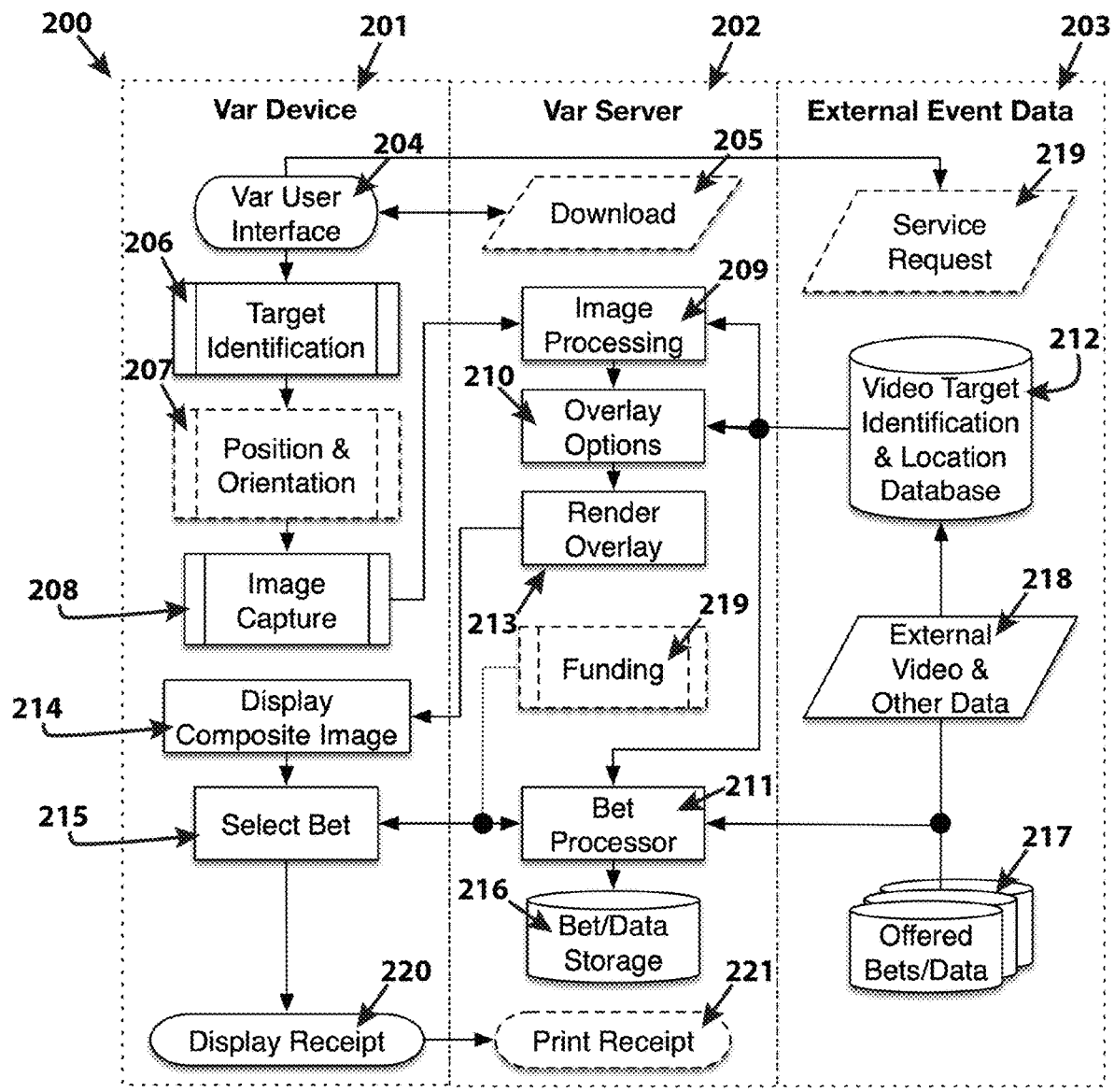
FIG. 2A is an overall swim lane flowchart representative example of the processes associated with displaying and processing the visual enhancements of a Valet Augmented Reality (VAR) system compatible with the specific embodiment of FIG. 1B.
Figure 2B:
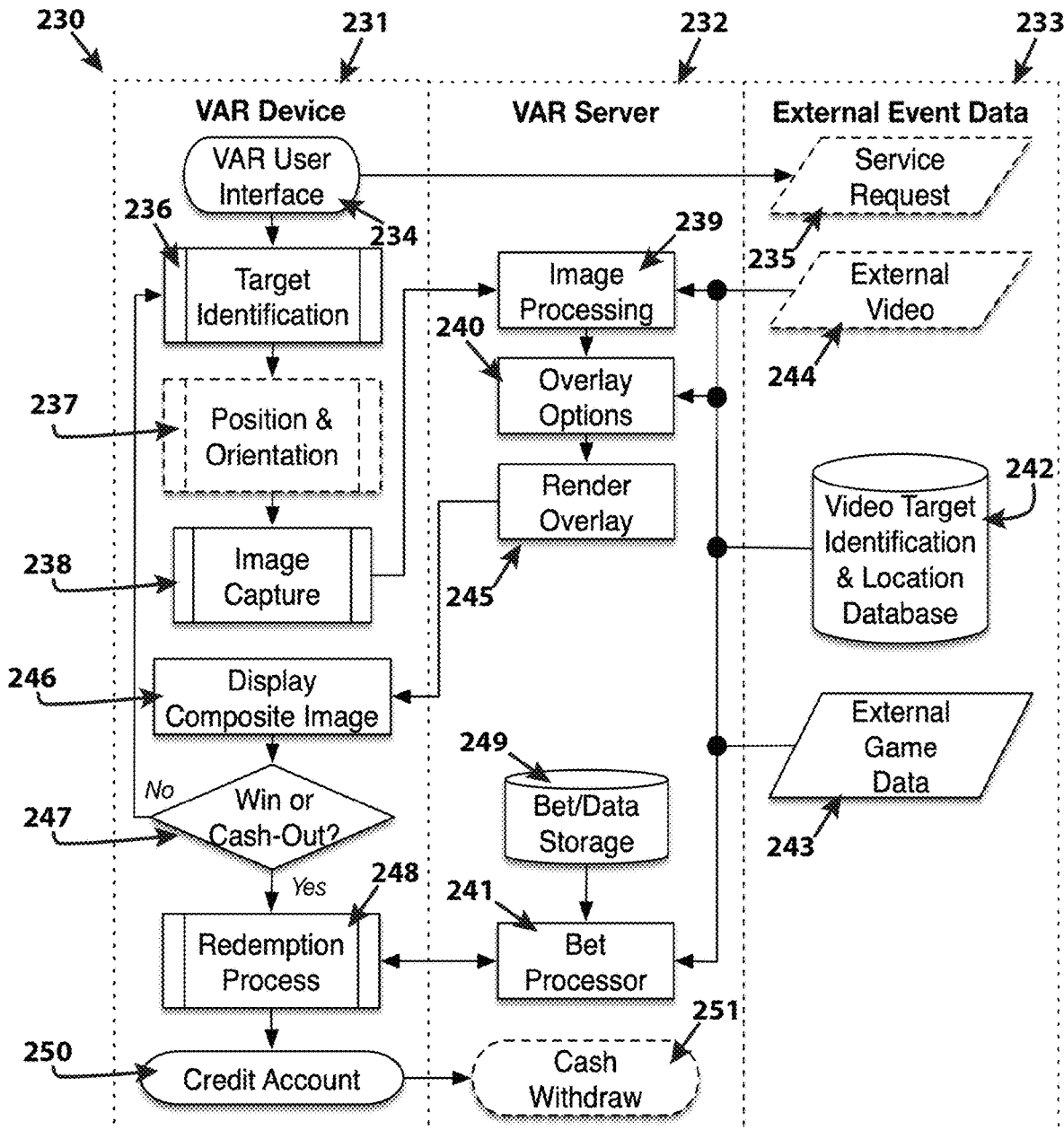
FIG. 2B is an overall swim lane flowchart representative example of the processes associated with displaying and processing the visual enhancements of a VAR system compatible with the specific embodiment of FIG. 1C.

FIGS. 2A and 2B, taken together, illustrate one embodiment of an exemplary VAR system at the time a wager is made by a consumer 200 (FIG. 2A) and at the time the sporting event is occurring 230 (FIG. 2B). As illustrated in the swim lane flowcharts 200 and 230 of FIGS. 2A and 2B, this one embodiment of the invention is conceptually divided into three groups (i.e., "VAR Device" 201 and 231, "VAR server" 202 and 232, and "External Event Data" 203 and 233) by the three "swim lane" columns as shown in both figures. If a particular flowchart function appears completely within a swim lane, its functionality is limited to the data category of the associated swim lane—e.g., optional Target Identification process 206 and 236 is exclusively processed by the VAR Device 201 and 231.

FIG. 2A swim lane flowchart 200 begins with the VAR User Device 204 optionally receiving a Download 205 of the VAR application. In some embodiments, the VAR application is active on the VAR User Device 204 to implement the invention. Preferably, the downloaded application may be automatically activated by a Bluetooth or wireless message that is received by the VAR User Device 204 when it passes through a portal such as a casino entrance. Alternatively, the application may be automatically activated by a "local" condition programmed into the VAR User Device 204, tied to the venue's Global Positioning System (GPS) location. In the simplest implementation, the application is manually activated by the consumer.

Assuming the VAR application is present and active on the VAR Device 201, the device can be initiated with one of two actions: (1) optionally identifying an object of interest 206 to begin the betting process thread or (2) used to request service 219 (e.g., cocktail, food, funding requests, manual bet) as the consumer desires. Whenever it is actuated, the Service Request 219 function seamlessly interacts with the casino's internal restaurant, bar, betting system, Point Of Sale (POS) system, etc. thereby passing the request and consumer's location for later completion by human staff or existing, prior art, automated process. Despite its location at the top of the flowchart, it should not be assumed that the Service Request 219 function is state dependent, rather it can be initiated at any time as an added separate thread to normal VAR operations when the consumer desires.

Returning to the betting process thread, the consumer points the VAR Device 201 at objects of interest (e.g., television displays of sporting events) that are within the field of view of the VAR Device's 201 camera and identified 206. This optional step is accomplished by physical reference points placed in the casino or television monitor for the camera to find e.g., barcodes, machine readable landmarks. Additionally, data displayed directly on the monitors may also assist or be exclusively utilized in Target Identification 206—e.g., barcodes, digital watermarks, Optical Character Recognition or "OCR", logo identification, the video broadcast itself. In an alternative embodiment, a message is displayed on the VAR Device 201 display asking the consumer to aim the internal camera at live feed sports monitors or other objects of interest in the venue.

In one specific embodiment, a Fast Fourier Transform (FFT) sampling algorithm is performed on periodic video scenes on each of the different channels on display and saved in the Video Target Identification & Location Database 212. In parallel, a FFT can also be performed on the video image within the field of view of the VAR Device's 201, such that if the FFT in the Video Target Identification & Location Database 212 and the FFT of the image within the field of view of the VAR Device's 201 camera are identical or mostly similar, the target can be reasonably identified. Among other things, this embodiment has the advantage of geographic diversity wherein the VAR Device 201 need not be at an a priori location, but could be anywhere (e.g., sports bar, home) that applicable laws allow. For example, FIG. 1F illustrates the same Formula One race 195 second embodiment of FIGS. 1D1, 1D2, and 1E, where the VAR Device 191 is deployed in a home environment 190 with real time updates concerning the on-going wager's status provided. Thus, the functionality of the VAR device 201 (FIG. 2A) is not necessarily limited to operation in a sports betting venue, VAR updates or other enhancements can be available wherever and whenever the VAR device 201 is focused on a video feed of interest. In another specific embodiment, the entire functionality of the VAR device 201 (i.e., support, wagering, updates, early cash-out, and validation of winning wagers) can be implemented anywhere local and federal laws allow.

Figure 4A:
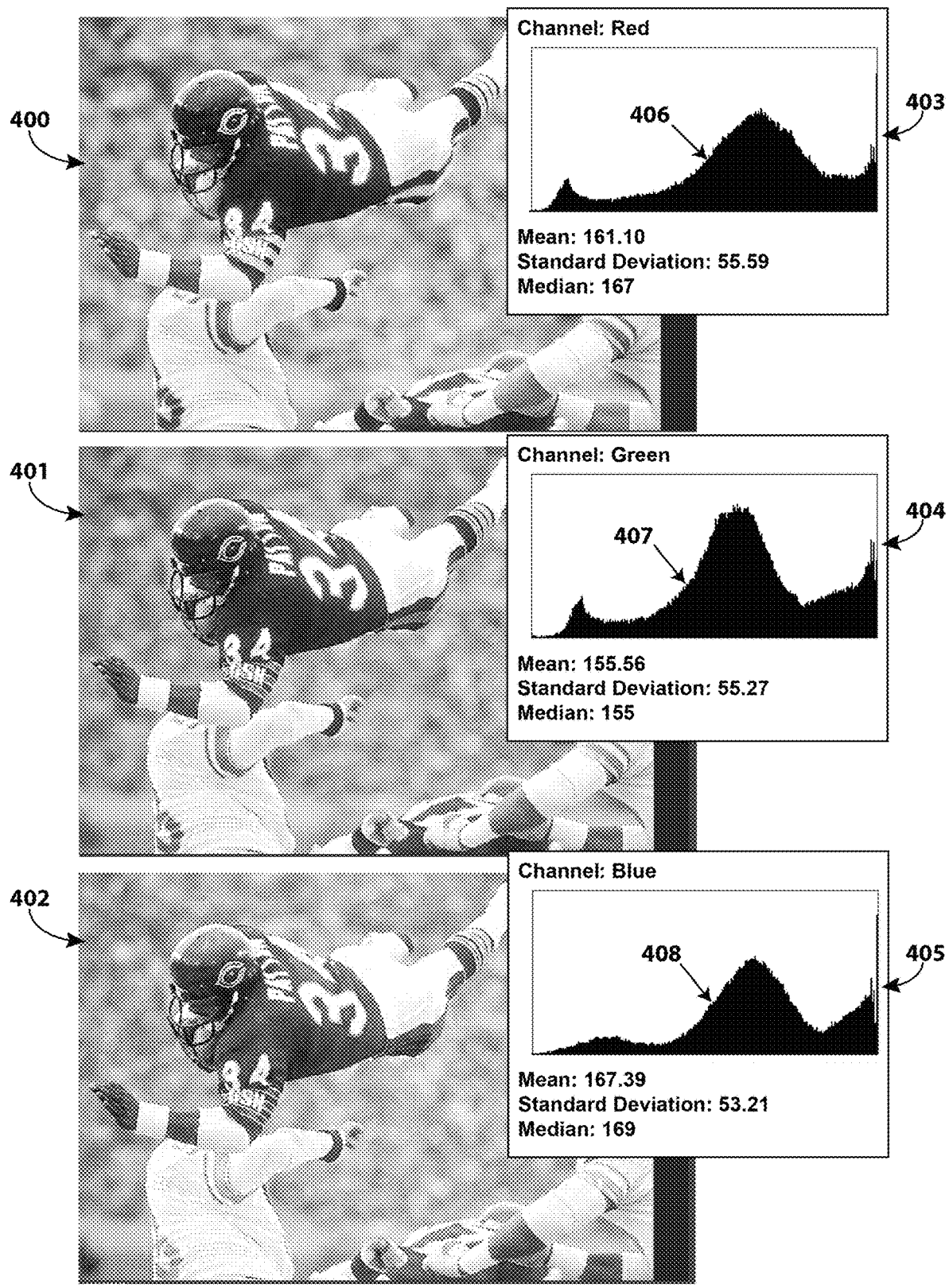
FIG. 4A provides three different illustrations and histograms of the common video frame of a sporting event from the perspective of red, green, and blue pixels.

In another specific embodiment, other sampling algorithms are executed on continuous or periodic video scenes from each of the different television programs available for betting and saved in the Video Target Identification & Location Database 212. For example, a histogram sampling algorithm of each of the video program's Red, Green, and Blue (RGB) data channels can be readily executed, providing a representation of the distribution of the intensities of each color's pixels with the number of pixels of a given value providing the ordinate (s-axis) coordinates with the abscissa (i-axis) coordinates arranged between 0 and 255 (assuming 8-bit video)—e.g., see 403 (red), 404 (green), and 405 (blue) of FIG. 4A and 423 (red), 424 (green), and 425 (blue) of FIG. 4B. Thus, the RGB channel histograms of a given video stream would provide an estimate of the probability distribution of the various RGB channel's pixel's intensity count as continuous variables. These types of histograms have the advantages of simplicity of calculation as well as typically not varying significantly from video-frame to video-frame so long as the general scene remains the same, although these types of histograms usually differ meaningfully if the scene changes—e.g., refer to FIGS. 4A and 4B. Both figures illustrate a single different video frame in the red (400 of FIG. 4A and 420 of FIG. 4B), green (401 of FIG. 4A and 421 of FIG. 4B), and blue (402 of FIG. 4A and 422 of FIG. 4B) channels of two different scenes of a football game. However, the associated histograms for each color channel of the two scenes differ significantly (404, 405, and 406 of FIG. 4A and 423, 424, and 425 of FIG. 4B) in terms of graph shapes and peaks (e.g., 406, 407, and 408 of FIG. 4A) as well as statistical parameters (e.g., mean, standard deviation, median).

These same types of RGB channel histograms can also be executed on the object of interest video image within the field of view of the VAR Device's 201 (FIG. 2A), such that if the histogram in the Video Target Identification & Location Database 212 and the histogram of the image within the field of view of the VAR Device's 201 camera are identical or mostly similar, the target can be reasonably identified. The typical similarity of histograms from one video frame to the next in the same scene accommodates any expected system latency occurring between camera capture and analysis and Video Target Identification & Location Database 212 comparison. The histogram stability throughout common scene frames is significant, because of the inherent latency between acquiring the object of interest image in the VAR device and identification via external event data 212, multiple video frames with the same identifying metrics or "fingerprint" increases redundancy while also ensuring that the video frames between the VAR device 201 and outside data 212 need not necessarily compare the exact same video frame. This is especially relevant when it is realized that even if the VAR device 201 and external data 212 time tag video frames in metadata, at the various Frames Per Second (FPS) rates commonly employed (e.g., traditional film at 24

FPS, standard television broadcasts at 60 FPS, newer standards at 120, 240, or 300 FPS) achieving clock synchronization between the VAR device 201 and external data 212 would require millisecond (ms) accuracy (e.g., approximately 42 ms for traditional film, 3 ms for 300 FPS).

In a preferred alternative specific embodiment, the object of interest video program display is divided into segments (e.g., halves, quadrants, eighths) with a histogram or other color sampling algorithm executed on each of the created segments. With this alternate specific embodiment, the Red, Green, and Blue (RGB) data channels in each segment are analyzed to create separate metrics summarizing the distribution of color and intensity of each segment. The derived metrics from each segment are then compared (e.g., ratio) to the metrics of the other segments with the resulting comparison metrics constituting the identifying aspects of the video program.

Figure 4B:
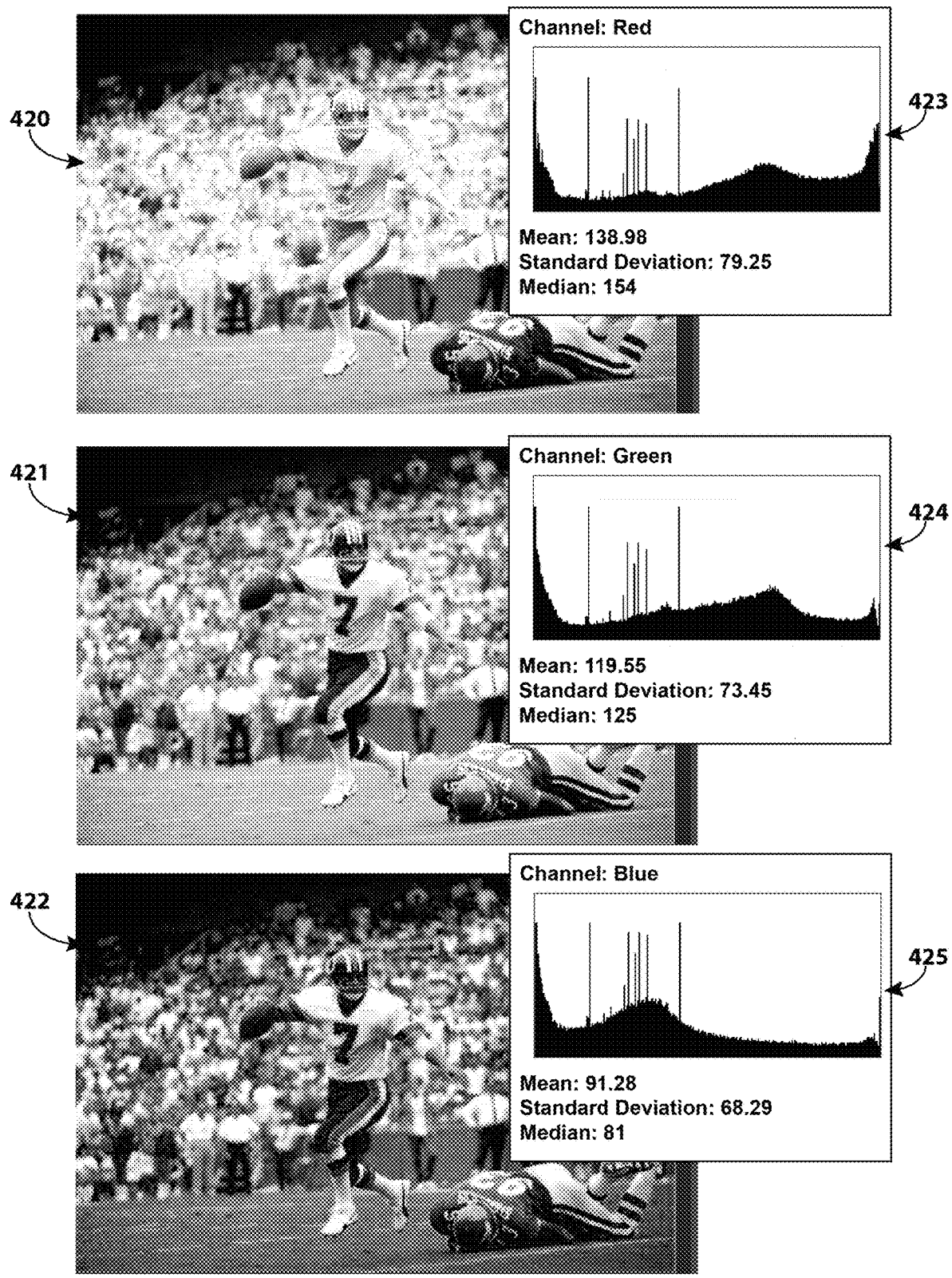
FIG. 4B provides three different illustrations and histograms of a different video frame of a sporting event than FIG. 4A from the perspective of red, green, and blue pixels.
Figure 4C:
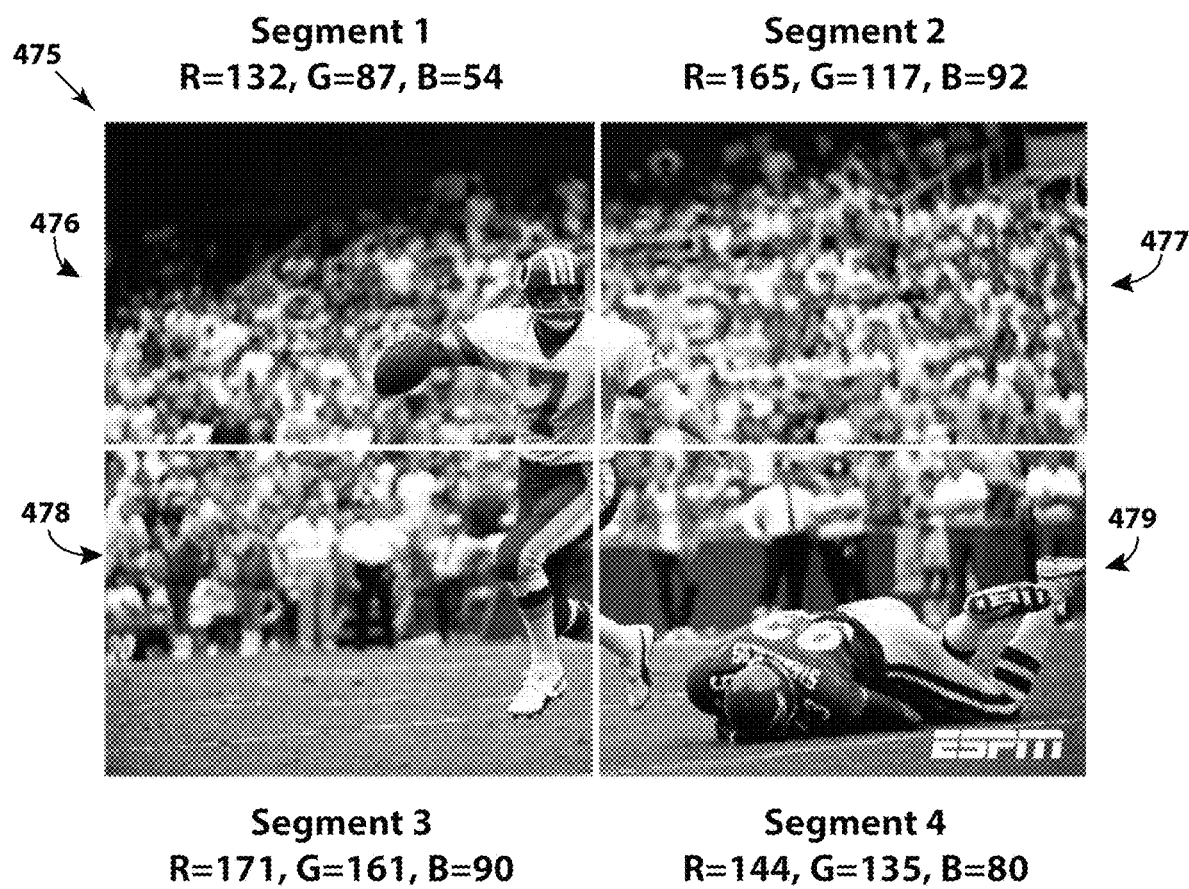
FIG. 4C provides an exemplary illustration of a video frame of a sporting event segmented into quadrants where the red, green, and blue pixel ratios of each segment are each compared to the corresponding ratios of the other segments.

For example, FIG. 4C illustrates the same common video frame of FIG. 4B divided into four segments 475. In this example, each segment (i.e., 476 thru 479) has its own summation or count metrics covering the total number of red, green, and blue pixels exceeding an a priori threshold—e.g., total number of pixels in each RGB channel with intensities exceeding an overall median average of "116" decimal on a possible intensity scale of 0-255. The count metrics from each segment are then compared to the count metrics from the other segments in the form of a ratio between the same RGB color channels (e.g., the ratios between 476 "Segment 1" and 477 "Segment 2" RGB channels would be "R=132:165", "G=87:117", and "B=54: 92" or "B=27:46" simplified) with the resultant ratios between all segments becoming the final metrics utilized to identify or "fingerprint" each specific object of interest video program display frames. In an alternative exemplary embodiment, each segment's RGB summation metrics could be first converted to percentages of each segment with ratios between the resultant percentages utilized to identify or "fingerprint" each specific object of interest video program display frame. The percentage alternative exemplary embodiment having the advantage of inherently representing the relative distribution of high luminosity RGB pixels within a segment with a higher noise immunity from variations in screen brightness or environmental lighting.

The various RGB count metrics and associated percentages for the four exemplary segments (476, 477, 478, and 479) of FIG. 4C are listed in Table 1. The associated ratios for the RGB count metrics and associated percentages of the four exemplary segments are listed in Table 2. The ratios provided in Table 2 constitute the final metrics utilized to identify or "fingerprint" each specific object of interest video display frame. As before, these resultant ratio final metrics derived from the VAR device (201, FIG. 2A) would then be compared to the associated identification ratio final metrics derived from external event data 212 such that if the final metrics in the Video Target Identification & Location Database 212 and the final metrics of the image within the field of view of the VAR Device's 201 camera are identical or mostly similar, (e.g., ratios within one or two standard deviations) the target can be reasonably identified. When it is realized that predominantly the video display frames managed will be "live" and provided on a real time basis, rapid and automated processing that is typical of segmenting and accumulating comparison metrics from each segment is readily compatible to these types of continuous updating applications.

TABLE 1

Segment Data from FIG. 4C

| | (476) Segment 1 | | (477) Segment 2 | | (478) Segment 3 | | (479) Segment 4 | |
| --- | --- | --- | --- | --- | --- | --- | --- | --- |
| | Count | Percentage | Count | Percentage | Count | Percentage | Count | Percentage |
| Red | 132 | 48% | 165 | 44% | 171 | 41% | 144 | 40% |
| Green | 87 | 32% | 117 | 31% | 161 | 38% | 135 | 38% |
| Blue | 54 | 20% | 92 | 25% | 90 | 21% | 80 | 22% |
| Total | 273 | 100% | 374 | 100% | 422 | 100% | 359 | 100% |

In addition to the real time processing benefits, this segmentation and comparison preferred alternative specific embodiment, also has the advantage of ready adaptability to machine learning. When developing the algorithms for target identification, the algorithm can record multiple types of video feeds by dividing the frames into segments and comparing the metrics from each segment to each other segment with this data compared to "noisy" video frames also in its test database (e.g., skewed target video, low contrast video, poorly framed video, high or colored ambient lighting) with the algorithm automatically adjusting its own parameters (e.g., acceptable tolerance in metric deviations, segmentation, types of metrics) to achieve the best identification rates.

TABLE 2

FIG. 4C Segment Data Ratios

| | (476) Segment 1 | | (477) Segment 2 | | (478) Segment 3 | | (479) Segment 4 | |
| --- | --- | --- | --- | --- | --- | --- | --- | --- |
| | Count | Percentage | Count | Percentage | Count | Percentage | Count | Percentage |
| (476) Segment 1 Red | N/A | N/A | 132:165 | 48%:44% | 132:171 | 48%:41% | 132:144 | 48%:40% |
| (476) Segment 1 Green | N/A | N/A | 87:117 | 32%:31% | 87:161 | 32%:38% | 87:135 | 32%:38% |
| (476) Segment 1 Blue | N/A | N/A | 54:92 | 20%:25% | 54:90 | 20%:21% | 54:80 | 20%:22% |
| (477) Segment 2 Red | 165:132 | 44%:48% | N/A | N/A | 165:171 | 44%:41% | 165:144 | 44%:40% |
| (477) Segment 2 Green | 117:87 | 31%:32% | N/A | N/A | 117:161 | 31%:38% | 117:135 | 31%:38% |
| (477) Segment 2 Blue | 92:54 | 25%:20% | N/A | N/A | 92:90 | 25%:21% | 92:80 | 25%:22% |
| (478) Segment 3 Red | 171:132 | 41%:48% | 171:165 | 41%:44% | N/A | N/A | 171:144 | 41%:40% |
| (478) Segment 3 Green | 161:87 | 38%:32% | 161:117 | 38%:31% | N/A | N/A | 161:135 | 38%:38% |
| (478) Segment 3 Blue | 90:54 | 21%:20% | 90:92 | 21%:25% | N/A | N/A | 90:80 | 21%:22% |
| (479) Segment 4 Red | 144:132 | 40%:48% | 144:165 | 40%:44% | 144:171 | 40%:41% | N/A | N/A |
| (479) Segment 4 Green | 135:87 | 38%:32% | 135:117 | 38%:31% | 135:161 | 38%:38% | N/A | N/A |
| (479) Segment 4 Blue | 80:54 | 22%:20% | 80:92 | 22%:25% | 80:90 | 22%:21% | N/A | N/A |

Of course, as is apparent to one skilled in the art in view of this disclosure, there are numerous variations on the exemplary segmentation and comparison embodiment 475 of FIG. 4C that may under some circumstances be more desirable then the present disclosure. For example, the number of segments may be readily increased to enhance resolution or the sizes and shapes of the various segments may be asymmetrical providing more emphasis to portions of the video frame (e.g., the segment in the center of the video frame may be larger with multiple smaller segments surrounding the circumference of the larger center segment, thereby emphasizing the frame's center compared to its surroundings). Additionally, the final comparison metrics may differ (e.g., ratios divided to produce a single decimal value for each segment comparison) or be derived from other sampling algorithms such as FFTs or histograms.

Regardless of the alternative specific embodiment employed, the general concept of dividing the object of interest video program display into segments with metrics from each segment compared to the metrics of the other segments to provide the final metrics or "fingerprint" thereby identifying the video program has the advantages of: low computational load, inherent noise immunity, relatively stable final metrics from frame-to-frame so long as the scene remains the same, and adaptability for machine learning. The general concept being to model the balance of color distribution in various areas of the video screen (e.g., blue sky at top, green grass at the bottom) rather than attempt to identify the objects actually being displayed on the screen.

Figure 4D:
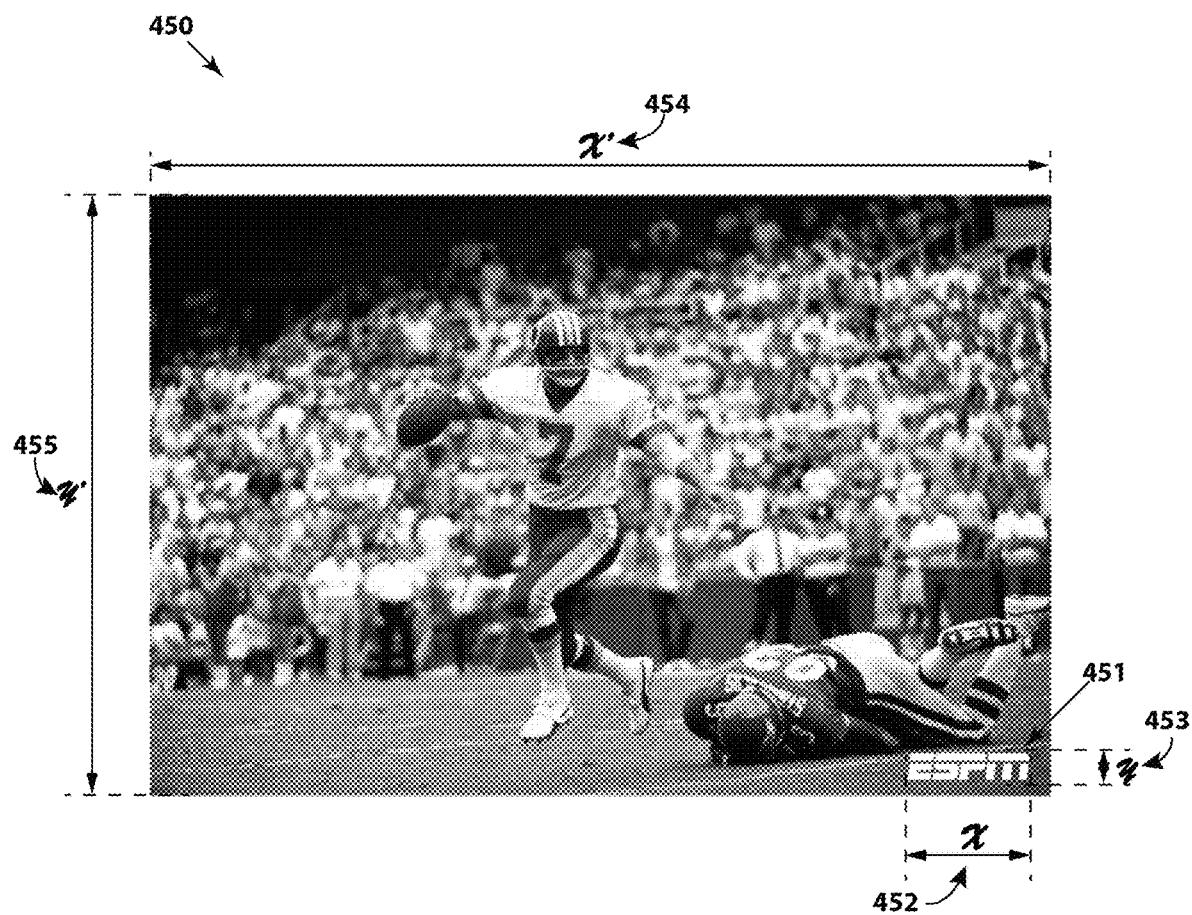
FIG. 4D illustrates the common video frame of FIGS. 4B and 4C with an a priori logo superimposed over the video frame thereby providing aid with video identity detection as well as scale and skewing of the video frame.

Though, the system's reliance on the consumer consistently pointing and properly framing the VAR Device 201 about the television program of interest can be inherently noisy. Noise sources can be introduced by how well the object of interest is framed or cropped within the VAR Device's 201 field of view with noise introduced by portions of the background outside of the intended object of including background wall surfaces or even portions of other television broadcasts. Additionally, noise can also be introduced from the ambient lighting in the room that the VAR Device 201 is located. Fortunately, this environmental background noise can be greatly mitigated by identifying a priori symbols of indicia consistently imbedded in the object of interest. For example, FIG. 4D illustrates 450 the common video frame of FIG. 4B with an a priori logo 451 (FIG. 4D—i.e., "ESPM") superimposed over the video frame thereby providing aid with video identity detection as well as scale and skewing of the video frame. As is already acknowledged in the art, these types of a priori logos 451 are readily machine identifiable utilizing cloud based neural networks. Once identified the a priori logo 451 can be employed in the identification algorithm to reduce the number of possible video feeds and may under some circumstances completely eliminate the need for other identification processes.

Additionally, since the broadcast size and shape (452 and 453) of the a priori logo 451 is "known" to the Video Target Identification & Location Database 212 (FIG. 2A), once the a priori logo 451 (FIG. 4D) is identified in the VAR Device's 201 (FIG. 2A) field of view, the perceived a priori logo 451 (FIG. 4D) size and shape (451 and 452) can be measured with a size transformation quickly calculated to determine the associated size and shape (454 and 455) of the television program object of interest, thereby reducing or eliminating extraneous noise sources outside of the object of interest by automatically cropping from the field of view. Similar transformations can also be performed on the perceived color and intensity of the a priori logo 451 and the overall object of interest thereby reducing or eliminating ambient lighting noise sources. The significant concept being that the a priori logo 451 typically persists through a substantial portion of the television broadcast independent of scene changes and consequently the a priori logo 451 is relatively straightforward to identify computationally.

Of course, as is apparent to those skilled in the art, there are other information or data sources associated with the television program object of interest that can assist in program identification. For example, the audio associated with the broadcast can also be captured and utilized as a secondary data or information source in addition to the video data to provide an additional or alternate method of program identification. Alternatively, "Chirp" technology where sound waves are utilized to transmit digital data either audibly or non-audibly could be employed to transmit out of band information also aiding in identifying the object of interest. These audio methods have the advantage of processing acoustic data bandwidth via soundwaves that, essentially providing a different out of band data source that is inherently immune to optical noise sources. However, these same acoustical out of video band data sources would also inherently have the disadvantages of susceptibility to audio noise in some environments (e.g., sports bar, casino sports betting venue). Another exemplary alternative data source to assist in program identification could be a Bluetooth transmitter beacon in or around the television display that identifies the display and the program being shown on it. Still another exemplary embodiment to assist in program identification would be to provide the consumer with a separate interface in the VAR device to allow him or her to manually identify the program of interest. Clearly, there are multiplicities of alternative data sources independent of the video feed itself that are available to a skilled artesian to serve as out of video band back channels for data transmission.

Returning to FIG. 2A, the consumer pointing the VAR Device 201 at an object of interest also provides the system with ancillary data aiding in the object of interest detection 207—e.g., the physical position (e.g., location within a known facility) and orientation (e.g., pitch, yaw, roll, pointing direction) of the VAR Device 201. Once positioned, the VAR application optionally determines the location 207 of the Device 201, by means such as GPS, Bluetooth, or cell tower triangulation. Next, the orientation of the VAR Device 201 is determined. This may be accomplished by accessing the internal digital gyroscope embedded within the VAR Device 201. Optionally, this may be supplemented by placing the camera position and orientation within a virtual Three-Dimensional (3D) representation of the "known" location (e.g., sports betting venue). This virtual representation may be built up in the Video Target Identification & Location Database 212 by parsing the a priori data of position orientations of television monitors and other objects. This database 212 may be continuously updated with External Video & Other Data 218, thereby ensuring that any event content currently displayed on the sports venue television monitor under examination is "known" to the VAR system.

The initially captured image 208 is then transmitted to the VAR Server's 202 Image Processing 209 function that first ensures (e.g., video displayed barcodes, digital watermarks, Optical Character Recognition or "OCR", indicia in the proximity of the monitors, color histograms, FFTs) that the captured image is consistent with the data associated with one television program in the Video Target Identification & Location Database 212 output, if so a virtual position on the VAR Device's 201 display may be derived by performing an inverse projection matrix on the Two Dimensional (2D) coordinates of the displayed video. In an alternative embodiment, the Image Processing 209 function could be performed by the VAR device itself. The camera captured image is rendered 213 with virtual valet overlaid 210 information (of course, the rendering of virtual valet overlaid 210 information may also be executed on the VAR device itself). The virtual valet overlaid information 210 display is a function of the sporting event of the captured image as well as current betting options available for the same event as determined by the Bet Processor 211 and associated Offered Bets and Data databases 217. It should be noted, that the Offered Bets and Data databases 217 are not necessarily generic or universal, in a preferred embodiment the Offered Bets and Data databases 217 may include references to the consumer's previous betting history. With this preferred embodiment, suggested bets may be highlighted that are consistent with the consumer's betting history or alternatively "Catastrophic Gambler's Insurance" may be offered to the consumer based on his or her betting history. Regardless of the configuration of the Offered Bets and Data databases 217, the resulting composite rendered image 213 is then transmitted back to the VAR Device 201 for display on its screen 214. An example of this composite output is shown in FIG. 1B.

Next, assuming the consumer elects to make a wager, a specific bet is selected on the VAR ergonomic interface 215 (FIG. 2A) with that bet being logged by the Bet Processor 211 into the Bet and Other Data Storage database 216. If the consumer's identity is already known to the VAR Server 202, the pending bet can be funded by the Bet Processor 211 from the consumer's account and the wager is finalized. However, if the consumer is anonymous to the VAR Server 202, the desired wager will be placed in a "pending" status where it is assigned a unique serial number by the Bet Processor 211 with the assigned serial number and associated pending status transmitted back to the VAR Device's 201 with an appropriate notification rendered on its display. At this point, an anonymous consumer can take the VAR Device 201 to a human clerk or Automated Teller Machine (ATM) located within the casino, transfer the pending serial number (e.g., Bluetooth, Near Field Communications or "NFC," displayed barcode) to the venue and pay for the wager via cash, debit card, or (when allowed by local law) credit card.

Assuming the bet is funded and complete, a virtual receipt 220 will be displayed on the VAR Device 201 and stored in its local memory. Optionally, a physically printed receipt 221 may be made available (e.g., printed out) when the VAR Device 201 transfers the request (e.g., Bluetooth, Near Field Communications or "NFC," displayed barcode) at an ATM, or other terminal, or to a human operator's station.

Once the wager or bet is completed, the VAR Device 231 continues to support the consumer throughout the sporting event's duration 230 of FIG. 2B. Again, a state independent Service Request 235 function may be initiated at any time as an added separate thread to normal VAR operations whenever the consumer desires.

To monitor a bet as a sporting event or game progresses 234, as before, the consumer points the VAR Device 231 on an object of interest (e.g., television displays of sporting events) thereby identified 236 via a process comparable to the betting process thread. In one specific embodiment, a message is displayed on the VAR Device 231 display asking the consumer to aim the internal camera at live feed sports monitors or other objects in the venue displaying games or events where wagers are pending. The VAR Device's 231 Position and Orientation 237 are optionally determined in a similar manner to the betting process thread.

The initially captured image 238 is then transmitted to the VAR Server's 232 Image Processing 239 function that first ensures that the captured image is consistent with the Video Target Identification & Location Database 242 output. Assuming the image is satisfactory, the camera captured image is then rendered 245 with virtual valet overlaid 240 information, this overlay rendering may optionally occur on the VAR device itself. However, with the sporting event or game progression thread, the virtual valet overlaid information 240 display is typically more dynamic, being driven by both the relatively static Bet Processor's 241 Bet Storage 249 committed wager data and the constantly changing External Game Data 243, thereby providing a continuously real time data stream of salient details of the sporting event or game. Typically, this type of real time data feed is provided by an outside provider (e.g., Sportradar®, Goalserve.com, Fantasydata.com) as a subscription service. Regardless of the real time data stream source, the resulting composite rendered image 245 is then transmitted back to the VAR Device 231 for display on its screen 246. An example of this composite output is shown in FIG. 1C. In an alternative embodiment, once the captured image is found to be consistent with the Video Target Identification & Location Database 242 (FIG. 2B), the consumer via the VAR Device 231 can optionally elect to receive the External Video 244 feed directly through the VAR device 231, thereby freeing the consumer from having to continuously hold the VAR device 231 focused on the object of interest. This "handoff" mode of live streaming of the event to the VAR device 231 can be supplied by the VAR Server 232, or alternatively through alternative channels available to the VAR device—e.g., FIG. 1G illustrates a VAR device 192 operating in handoff mode on a city street 199.

At this point, the sporting event or game progress thread continuously loops 247 (FIG. 2B—i.e., continuing to provide updates for the same game or event or, alternatively, changing to another game or event if the VAR Device 201's focus changes) until the game or sporting event ends or if the consumer optionally elects to cash-out before the event is concluded. If the sporting event or game ends with the consumer a winner or the consumer elected to exercise a cash-out option 247, the thread progresses to the Redemption Process 248. The VAR Device 231 then transmits the winning or cash-out digital serial number to the VAR Server 232 where the Bet Processor 241 queries its Bet and other Data Storage 249 database to determine if the received serial number is in fact valid. Assuming the received serial number is valid and the consumer is known to the VAR system, the Bet Processor 241 will credit their account 250 with a notification appearing on the VAR Device's 231 screen. Alternatively, if the request is valid and the consumer is unknown to the system, a payment token will be transmitted to the VAR Device's 231 memory thereby enabling a Cash Withdraw 251 when the VAR Device 231 transfers the request (e.g., Bluetooth, Near Field Communications or "NFC," displayed barcode) to an ATM, or other terminal, a smart card, or to a human operator's station. If a paper receipt was provided at the time of the wager, the consumer could also elect to use the paper receipt as a bearer document demanding payment.

Of course, as is apparent to one skilled in the art, there are numerous variations on the exemplary VAR embodiments 200 and 230 (e.g., wearable AR displays rather than smart phones, viewing sporting events on a single television screen at a sports bar or home) that may under some circumstances be more desirable then the present disclosure.

Figure 2C:
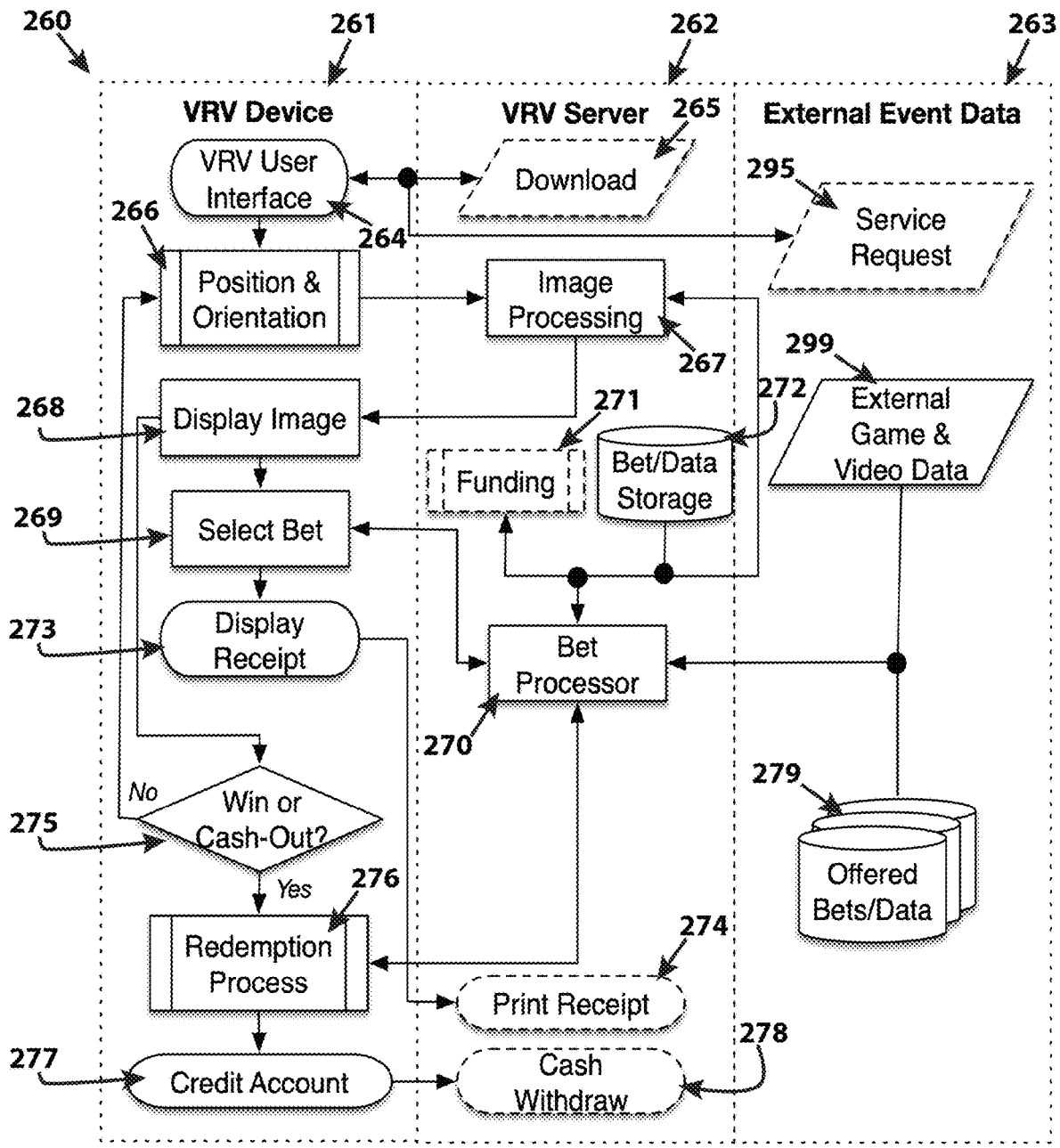
FIG. 2C is an overall swim lane flowchart representative example of the processes associated with displaying and processing the visual enhancements of a Virtual Reality Valet (VRV) system for both betting and in-play.

FIG. 2C illustrates one embodiment of an exemplary VRV system both at the time a wager is made by a consumer and at the time the sporting event or game is occurring 260. As illustrated in the swim lane flowcharts 260, the VRV embodiment of the invention, like the VAR embodiment, is conceptually divided into three groups (i.e., "VRV Device" 261, "VRV server" 262, and "External Event Data" 263) by the three "swim lane" columns as shown in both figures. As before, if a particular flowchart function appears completely within a swim lane, its functionality is limited to the data category of the associated swim lane—e.g., Position & Orientation process 266 is exclusively processed by the VRV Device 261.

The swim lane flowchart 260 begins with the VRV User Device 264 optionally receiving a Download 265 of the VRV application. The VRV application needs to be active on the VRV User Device 264 to implement the invention. Since the VRV embodiment is location agnostic (i.e., unlike the AR embodiments, by the very nature of "virtual reality" the physical environment that the consumer is occupying at the time of use is irrelevant) automatic activation of the VRV application depending on location is not necessarily favored, with consumer manual activation being the preferred embodiment. Likewise, while the VRV embodiment can support external Service Requests 295 like the VAR embodiment (e.g., cocktail, food, funding requests) as the consumer desires, typically the VRV embodiment will be utilized in physical environments where Service Request 295 physical infrastructure is not available (e.g., home).

When the VRV application is present and active on the VRV Device 261, the consumer will be immersed into a synthetic virtual world without any visual contact to the surrounding environment. Consequently, unlike the previously discussed VAR embodiment, with the VRV embodiment only the positioning and orientation of the consumer's head will determine the object of interest within the created virtual environment that typically supplies a plurality of items of interest. Therefore, the configuration of the virtual environment itself determines the live sports events and games available at the time and is integral to the disclosure of the invention. For purposes of simplicity and expediency, the following discussion will assume that the created virtual environment for the VRV embodiment will be similar to the casino sports betting venue illustrated in FIGS. 1A, 1B, and 1C.

To make a bet, the consumer starts the VRV application 264 (FIG. 2C) and positions and orients the VRV Device 261 on a virtual object of interest thereby actuating the Position & Orientation function 266. Once positioned, the VRV application determines the orientation of the VRV Device 261 by accessing the internal digital gyroscope, accelerometer, and compass. After the orientation of the VRV Device 261 is known, the object of interest (e.g., television display of sporting events) is transmitted to the VRV Server 262 Image Processing 267 function that also receives available betting information from the Bet Processor 270 and Offered Bets and Data databases 279 for the object viewed by the consumer. This betting information is overlaid on the virtual object of interest with the composite image information transmitted back to the VRV Device 261 for display 268. The consumer then may select a particular bet 269 using the VRV Device 261 where hand motions or a controller typically determine the selection process. When the bet is selected 269, the bet request is transmitted to the VRV Server 262 Bet Processor 270, which assuming the consumer is "known" to the system and their account has sufficient funding, logs the bet in the Bet and Data Storage 272 database. However, if the consumer is anonymous to the VRV Server 262, the desired wager will be placed in a "pending" status where it is assigned a unique serial number by the Bet Processor 270 with the assigned serial number and associated pending status transmitted back to the VRV Device's 261 with an appropriate notification rendered on its display. At this point, the anonymous consumer (assuming he or she is in a casino, sports bar, or other such social environment) can offer to pay for the pending wager with a human cashier or 271 alternatively engage the VRV ergonomic interface to establishment a payment venue via prepaid, debit, or credit (assuming local laws allow) card 271. Assuming the bet is funded and complete, a virtual receipt 273 will be displayed on the VRV Device 261 and stored in its local memory. Optionally, a physically printed receipt 274 would also be available printed out when the VAR Device 201 transfers the request (e.g., Bluetooth, WiFi) to a printer.

Once the wager or bet is completed, the VRV Device 261 continues to support the consumer throughout the sporting event's duration 275. To monitor a bet as a sporting event or game progresses, as previously discussed, the consumer positions and orients the VRV Device 261 on a virtual object of interest actuating the Position & Orientation function 266. The VRV Device's 261 position and orientation are determined in a similar manner to the betting process thread. Once the position and orientation of the VRV Device 261 is known, the objects of interest (e.g., virtual television displays of sporting events) that are then rendered 267 with virtual valet overlaid information. However, with the sporting event or game progression thread, the virtual valet overlaid information display is typically more dynamic and is driven by both the relatively static Bet Processor's 270 Bet Storage 272 committed wager data and the constantly changing External Game & Video Data 299, thereby providing a continuously real time data stream of salient details of the sporting event or game. Typically, this type of real time data feed is provided by an outside provider (e.g., Sportradar®, Goalserve.com, Fantasydata.com) as a subscription service. Regardless of the real time data stream source, the resulting composite rendered image 267 is then transmitted back to the VRV Device 231 for display.

At this point the sporting event or game progress thread continuously loops 275 (optionally changing from one wagered sporting event or game to another) until the game or sporting event ends or if the consumer optionally elects to cash-out before the event concluded. If the sporting event or game ends with the consumer being a winner or if the consumer elected to exercise a cash-out option 275, the thread progresses to the Redemption Process 276. The VRV Device 261 then transmits the winning or cash-out digital serial number to the VRV Server 262 where the Bet Processor 270 queries its Bet and Data Storage 272 database to determine if the received serial number is in fact valid. Assuming the serial number is valid and the consumer is known to the VRV system, the Bet Processor 270 will credit their account with a notification appearing on the VRV Device's 261 screen. Alternatively, if the request is valid and the consumer is unknown to the system, a payment token will be transmitted to the VRV Device's 261 memory thereby enabling a Cash Withdraw 278 when the VAR Device 261 transfers the request (e.g., Bluetooth, Near Field Communications or "NFC," displayed barcode) from an ATM, or other terminal, or to a human operator's station. Of course, if a paper receipt was provided at the time of the wager, the consumer could also elect to use the paper receipt as a bearer document demanding payment.

Figure 2D:
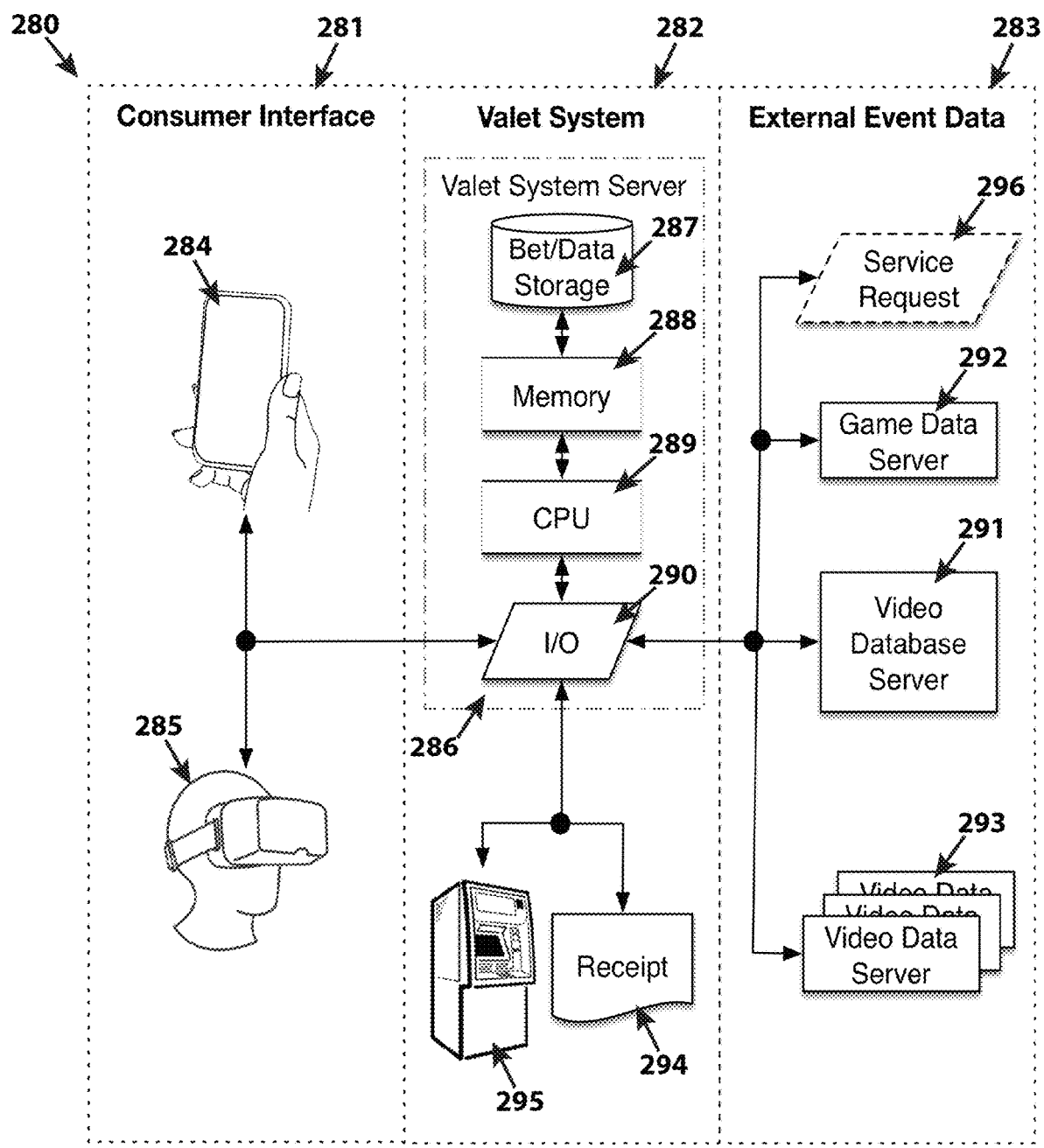
FIG. 2D is a representative example swim lane hardware block diagram of a virtual valet system embodiment as enabled by the specific embodiments of FIGS. 2A, 2B, and 2C.

The related swim lane system hardware architecture diagram 280 for both the VAR and VRV is illustrated in FIG. 2D. It is also conceptually divided into three groups (i.e., "Consumer Interface" 281, "Valet System" 282, and "External Event Data" 283) by the three "swim lane" columns. As before, if a particular flowchart function appears completely within a swim lane, its functionality is limited to the data category of the associated swim lane.

The Consumer Interface 281 (e.g., hand-held consumer smart phone functioning as an AR device 284 and VR goggles 285) provides the transaction portal(s) that interact with specific consumers, thereby enabling information exchange as well as wagers or bets to be sold and redeemed. All information requests as well as wagers or bets processed by the Valet System 282, are passed to the Valet System Server 286 for processing, recording, and optional redemption via casino ATMs 295, smart card, and/or paper receipts 294 given to a human operator. External Event Data 283 is supplied from different sources depending on the type of information: the Game Data Server 292 being cognizant of all current odds and structures for all sporting events or games where betting is permitted, the Video Database Server 291 tracking what video feeds are present on which monitors, the Video Data Servers 293 providing a priori data position orientations of sports venue television monitors and other objects as well as providing real time data feeds (from possibly multiple sources) of the displayed sporting events or games, and the optional Service Request 296 providing an interface to casino POS support services (e.g., bar, food).

All Consumer Interface 281 requests are received by the Valet System Server's Input and Output (I/O) 290 and onto the server's Central Processing Unit (CPU) 289 and associated Memory 288. The Valet System Server's Bet and Data Storage 287 provides the non-volatile log of record for all wagers made by the consumer.

Once the wager or bet is completed, the VAR Device 231 continues to support the consumer throughout the sporting event's duration 230 of FIG. 2B. Again, a state independent Service Request 235 function may be initiated at any time as an added separate thread to normal VAR operations whenever the consumer desires.

Figure 2E:
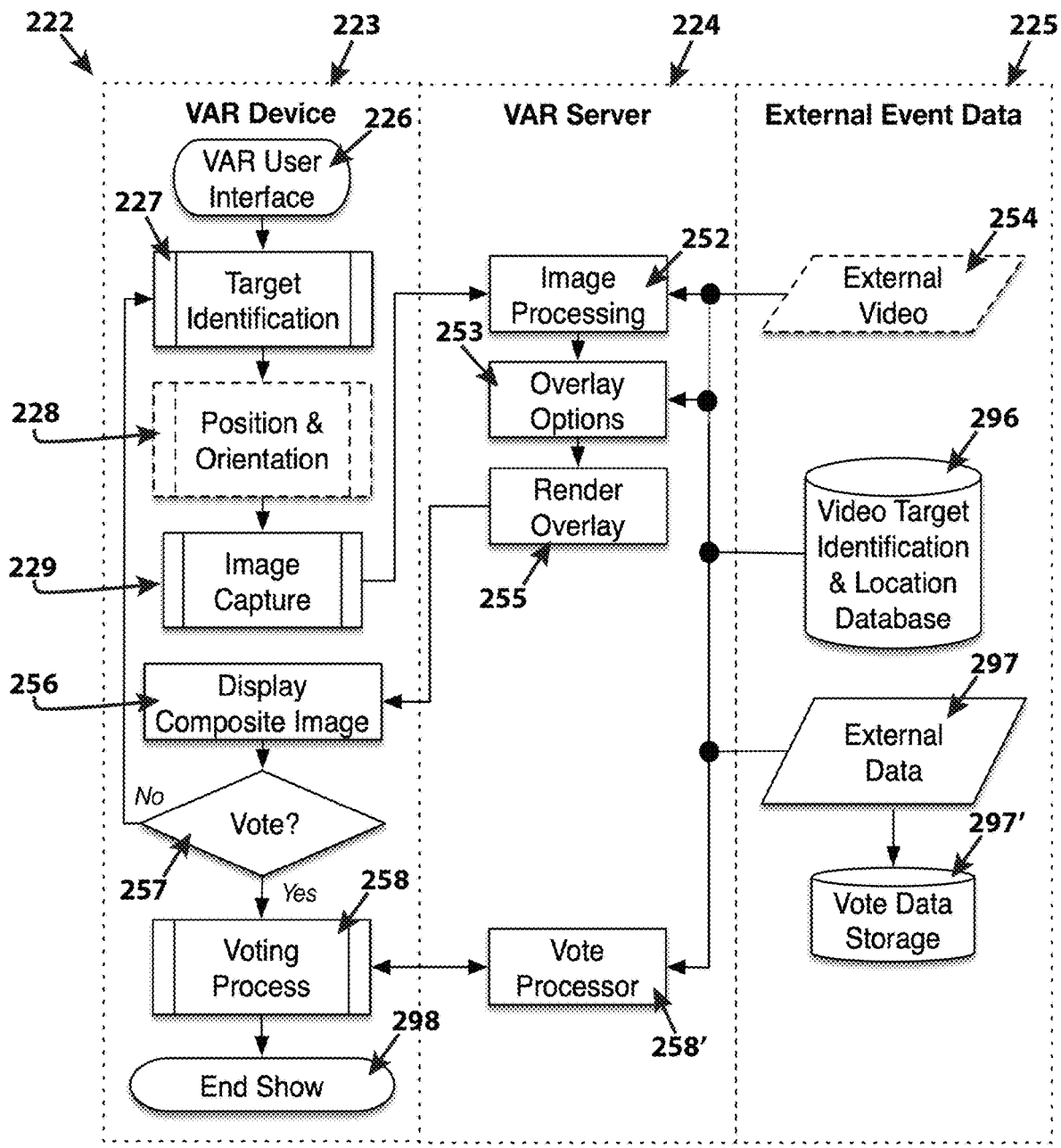
FIG. 2E is an overall swim lane flowchart representative example of the processes associated with displaying and processing the visual enhancements of a VAR system compatible with the specific embodiment of FIG. 1L.

In non-gaming embodiments, such as "The Choice" embodiment 110 of FIG. 1L, the same disclosed VAR devices and processes described for gaming or gambling environments can be employed to enable consumer interaction or data updates. For example, FIG. 2E illustrates an alternative non-gambling embodiment 222 to enable consumer voting for the exemplary "The Choice" embodiment 110 of FIG. 1L. As illustrated in the swim lane flowchart 222 of FIG. 2E, this alternative embodiment of the invention is conceptually divided into three groups (i.e., "VAR Device" 223, "VAR server" 224, and "External Event Data" 225) by the three "swim lane" columns as shown. If a particular flowchart function appears completely within a swim lane, its functionality is limited to the data category of the associated swim lane.

To monitor the exemplary television program and vote on contestants as the program progresses, as before the consumer points the VAR Device 223 on an object of interest (e.g., 110 of FIG. 1A) by utilizing the VAR application and user interface 226 (FIG. 2E) which initiates the Target Identification process 227. The VAR Device's 223 Position and Orientation 228 process optionally embeds metadata that can be utilized to aid in positioning and skewing of any overlays that will be generated.

The initially captured image 229 is then transmitted to the VAR Server's 224 Image Processing 252 function ensuring that the captured image is consistent with the Video Target Identification & Location Database 296 output. Assuming the image is satisfactory, the camera captured image is then rendered 255 with virtual valet overlaid 253 information, this overlay rendering may optionally occur on the VAR device itself with the Composite Image displayed 256. In an alternative embodiment, once the captured image is found to be consistent with the Video Target Identification & Location Database 296, the consumer via the VAR Device 223 can optionally elect to receive the External Video 254 feed directly through the VAR device 223, thereby freeing the consumer from having to continuously hold the VAR device 223 focused on the object of interest—e.g., see 114 of FIG. 1N. This "handoff" mode of live streaming of the event to the VAR device 223 (FIG. 2E) can be supplied by the VAR Server 224, or alternatively through alternative channels available to the VAR device.

At this point, the television show progress thread continuously loops 257 (i.e., continuing to provide updates for the same show or event or, alternatively, changing to another show or event if the VAR Device 223's focus changes) until the show or event ends 298, the contestant(s) change, or if the consumer elects to vote 257 for a contestant. If the consumer voted 257 for a contestant in a predefined allowable time period, the consumer's vote is locally processed 258 on the VAR device, thereby bundling the consumer's choice with the appropriate flag data such that an External Event Data server 225 can properly decode the consumer's selection. Once the vote has been processed 258 locally, the bundled vote packet is typically forwarded to the VAR Server 224 where it is relayed 258' to the External Event Data server 225 as External Data 297 to be ultimately stored in the television show's voting database 297'.

Thus, the disclosed VAR devices can be utilized for both gaming and non-gaming embodiments. Examples of preferred embodiments of VAR devices are provided in FIGS. 2F and 2G when used for gaming applications and FIGS. 2H and 2I for non-gaming embodiments.

Figure 2F:
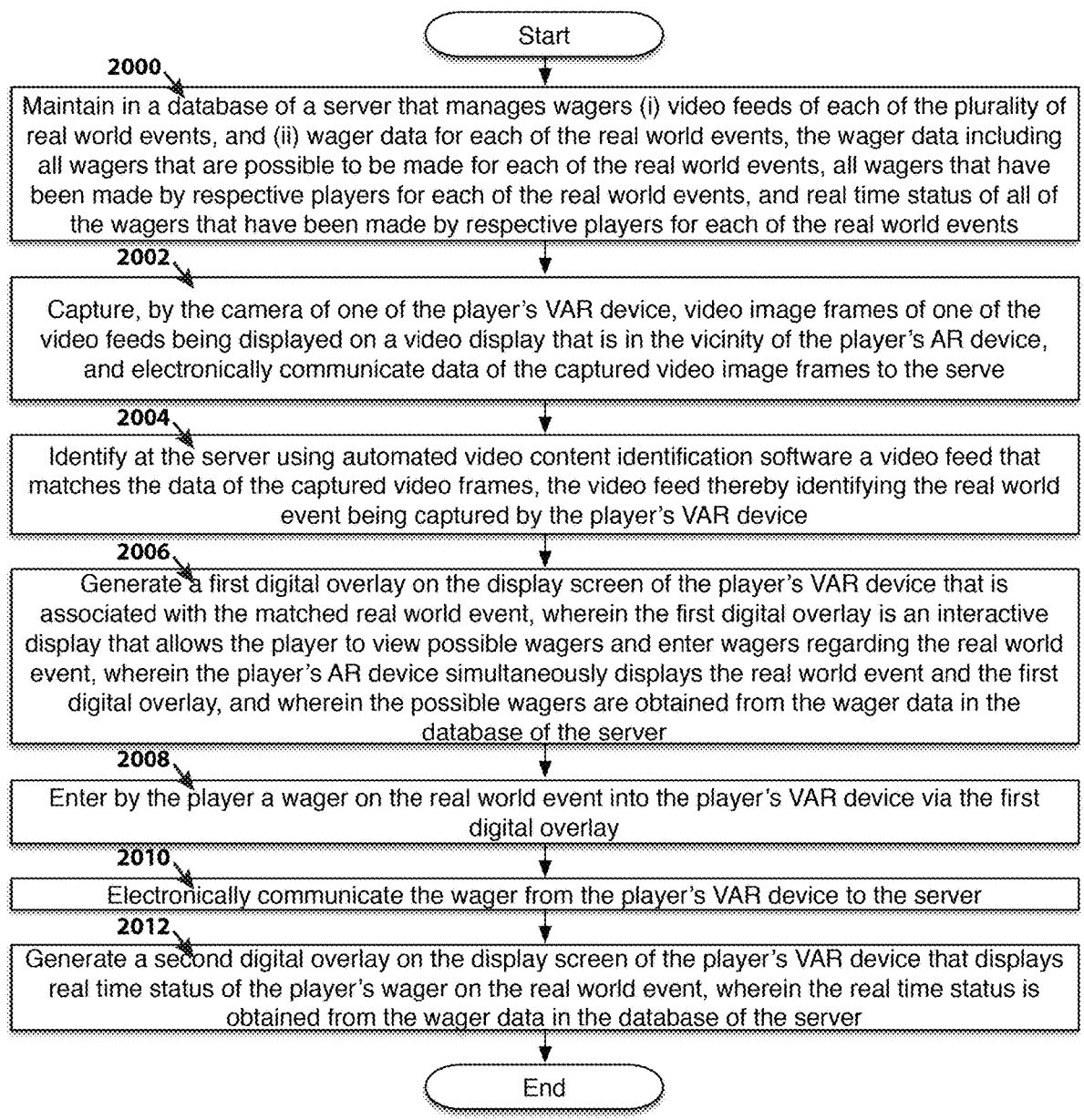
FIG. 2F is an overall flowchart representative example of the processes associated with displaying and processing the visual enhancements of a VAR system compatible with the embodiments of FIGS. 1B thru 1G, 1K, 2A thru 2B, and 2D.
Figure 2G:
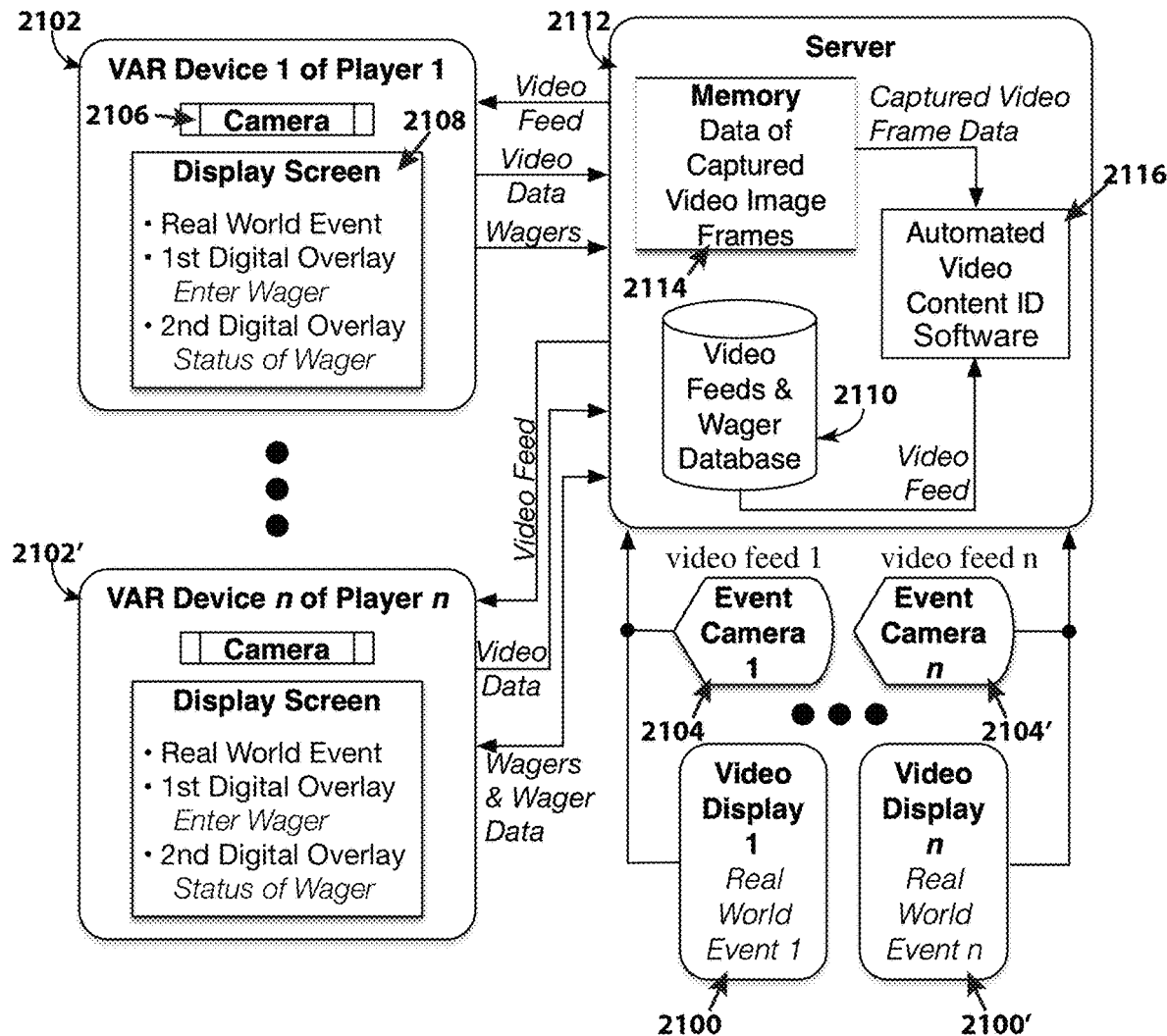
FIG. 2G is a schematic diagram representative example of the processes associated with displaying and processing the visual enhancements of a VAR system compatible with the embodiments of FIG. 2F.

FIG. 2F (flowchart) and FIG. 2G (schematic diagram), taken together, show one preferred embodiment of the present invention that allows a plurality of players 1-n to wager on one of a plurality of real world events 1-n being displayed on video displays 2100-2100' that are potentially viewable by VAR devices 2102-2102', and monitor progress of the real world events and status of wagers on the real world events using the VAR devices 2102. Each of the real world events are represented by a respective video feed 1-n that is output from a respective event camera 2104-2104' that captures the respective event. The VAR devices 2102 include a camera 2106 and a display screen 2108. Each VAR device 2102 is operated by, and associated with, a respective player. Referring to FIGS. 2F and 2G, the process operates as follows:

Step 2000: Maintain in a database 2110 of a server 2112 that manages wagers (i) video feeds of each of the plurality of real world events, and (ii) wager data for each of the real world events. The wager data includes all wagers that are possible to be made for each of the real world events, all wagers that have been made by respective players for each of the real world events, and real time status of all of the wagers that have been made by respective players for each of the real world events.

Step 2002: Capture, by the camera 2106 of one of the player's VAR device 2102, video image frames of one of the video feeds being displayed on a video display

2100 that is in the vicinity of the player's VAR device 2102, and electronically communicate data of the captured video image frames to the server 2112. The data of the captured video image frames are stored in memory 2114 of the server 2112.

Step 2004: Identify at the server 2112 using automated video content identification software 2116 a video feed that matches the data of the captured video frames, the video feed thereby identifying the real world event being captured by the player's VAR device 2102.

Step 2006: Generate a first digital overlay on the display screen 2108 of the player's VAR device 2102 that is associated with the matched real world event. The first digital overlay is an interactive display that allows the player to view possible wagers and enter wagers regarding the real world event. The player's VAR device 2102 simultaneously displays the real world event and the first digital overlay. The possible wagers are obtained from the wager data in the database 2110 of the server 2112.

Step 2008: Enter by the player a wager on the real world event into the player's VAR device 2102 via the first digital overlay.

Step 2010: Electronically communicate the wager from the player's VAR device 2102 to the server 2112.

Step 2012: Generate a second digital overlay on the display screen 2108 of the player's VAR device 2102 that displays real time status of the player's wager on the real world event. The real time status is obtained from the wager data in the database 2110 of the server 2112.

One example of the database 2110 may be a table having at least two fields, namely, video feeds and wager data. The video feeds include the video feeds for the real world events 1 to n.

Figure 2H:
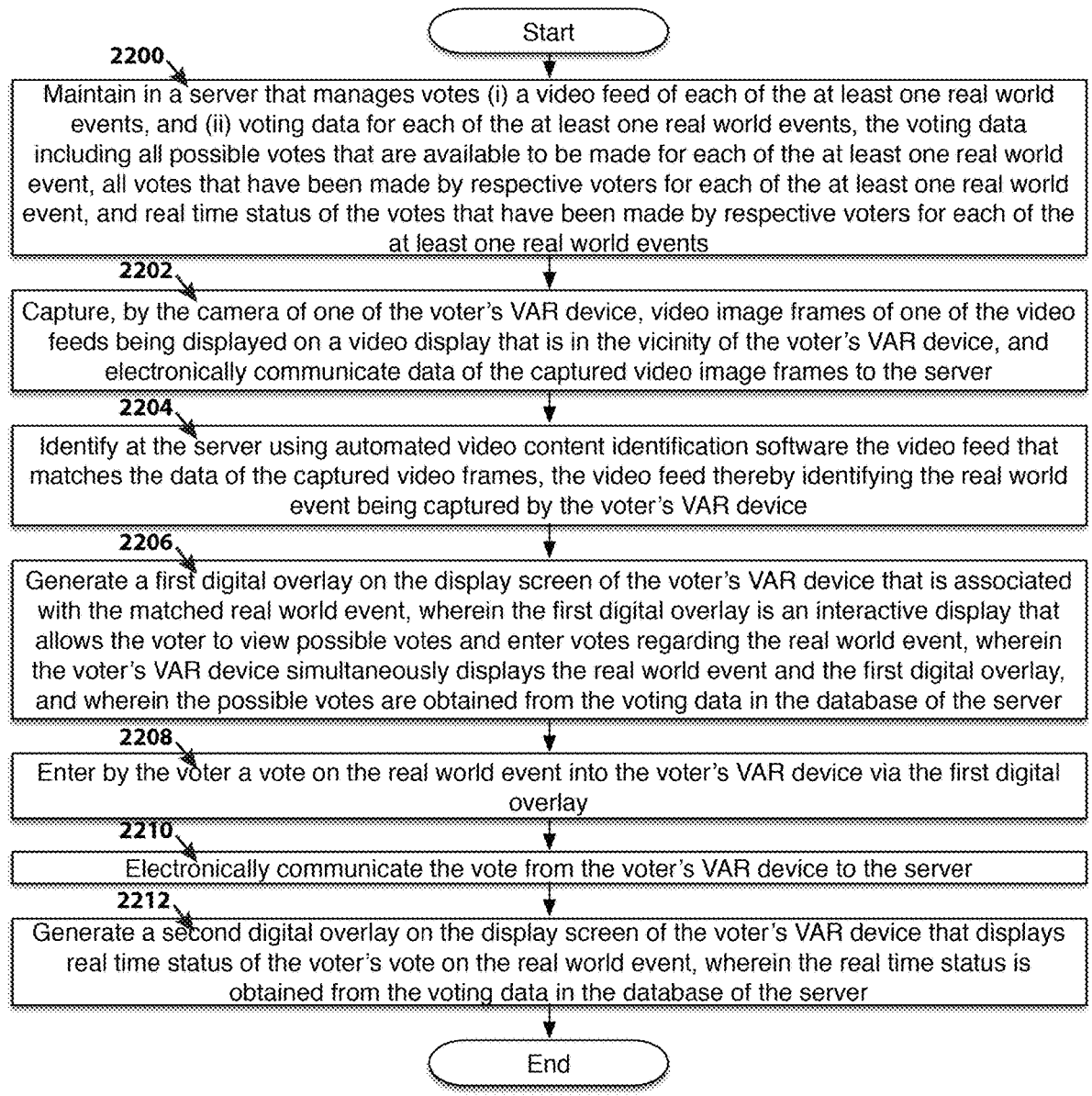
FIG. 2H is an overall flowchart representative example of the processes associated with displaying and processing the visual enhancements of a VAR system compatible with the embodiments of FIGS. 1M thru 1N, and 2E.
Figure 21:
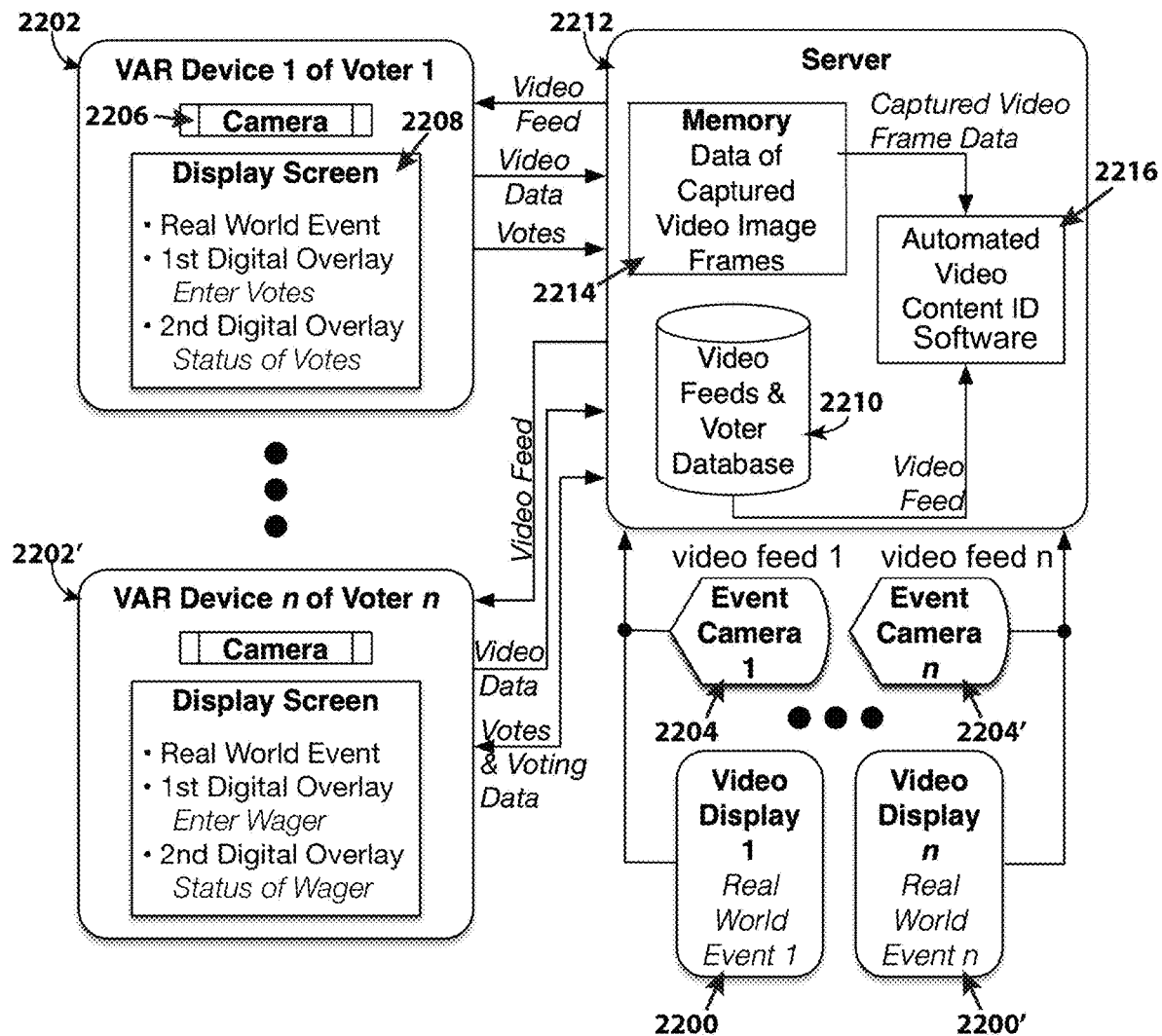

FIG. 2H (flowchart) and FIG. 2I (schematic diagram), taken together, show another preferred embodiment of the present invention that allows a plurality of voters 1-n to voter on one of a plurality of real world events 1-n being displayed on video displays 2200-2200' that are potentially viewable by VAR devices 2202-2202', and monitor progress of the real world events and status of wagers on the real world events using the VAR devices 2202. Each of the real world events are represented by a respective video feed 1-n that is output from a respective event camera 2204-2204' that captures the respective event. The VAR devices 2202 include a camera 2206 and a display screen 2208. Each VAR device 2202 is operated by, and associated with, a respective voter. Referring to FIGS. 2H and 2I, the process operates as follows:

Step 2200: Maintain in a database 2210 of a server 2212 that manages votes (i) a video feed of each of the at least one real world events, and (ii) voting data for each of the at least one real world events. The voting data includes all possible votes that are available to be made for each of the at least one real world event, all votes that have been made by respective voters for each of the at least one real world event, and real time status of the votes that have been made by respective voters for each of the at least one real world events.

Step 2202: Capture, by the camera 2206 of one of the voter's VAR device 2202, video image frames of one of the video feeds being displayed on a video display 2200 that is in the vicinity of the voter's VAR device 2202, and electronically communicate data of the captured video image frames to the server 2212. The data of the captured video image frames are stored in memory 2214 of the server 2212.

Step 2204: Identify at the server 2212 using automated video content identification software 2216 the video feed that matches the data of the captured video frames. The video feed thereby identifying the real world event being captured by the voter's VAR device 2202.

Step 2206: Generate a first digital overlay on the display screen 2208 of the voter's VAR device 2202 that is associated with the matched real world event. The first digital overlay is an interactive display that allows the voter to view possible votes and enter votes regarding the real world event. The voter's VAR device 2202 simultaneously displays the real world event and the first digital overlay. The possible votes are obtained from the voting data in the database 2210 of the server 2212.

Step 2208: Enter by the voter a vote on the real world event into the voter's VAR device 2202 via the first digital overlay.

Step 2210: Electronically communicate the vote from the voter's VAR device 2202 to the server 2212.

Step 2212: Generate a second digital overlay on the display screen 1308 of the voter's VAR device 2202 that displays real time status of the voter's vote on the real world event. The real time status is obtained from the voting data in the database 2210 of the server 2212.

One example of the database 2210 may be a table having at least two fields, namely, video feeds and voting data. The video feeds include the video feeds for the real world events 1 to n.

As discussed above, and illustrated in FIGS. 2G and 2I, automated video content identification software 2116/2216 is preferably used to identify the video feed that matches the data of the captured video frames. The video feed thereby identifies the real world event being captured by the player's AR device.

Various techniques may be implemented in the automated video content identification software. As previously described, segmented video frame data or histograms of video image frames may be generated, and then compared with segmented video frame data or histograms of video image frames created from the video feeds of the real world events. Time stamps are used to match up the appropriate video data to be compared. Other previously described techniques may also be used.

In addition to the previously described techniques, the video content identification software may use video-based Automatic Content Recognition (ACR). In one preferred embodiment, the video-based ACR uses video fingerprinting or digital watermarking. In the case of the video fingerprinting, the ACR software compares video fingerprints of captured video image frames to video fingerprints from the video feeds of the real world events. These techniques are well-known in the art, and thus are not described in further detail herein.

Regarding the data of the captured video image frames that are sent from the AR device to the server for use in the identification process, the data may be the actual video image frames which may then be subsequently analyzed using video-based ACR software, or the data may be representations of the captured video image frames, such as the segmented video frame data or histograms of video image frames described above. If a video-based ACR technique is used for the identification process, the data may be video fingerprints generated in the AR device, instead of in the server. Sending representations of the captured video image frames reduces bandwidth requirements of the communication channel between the AR device and the server.

Figure 3A:
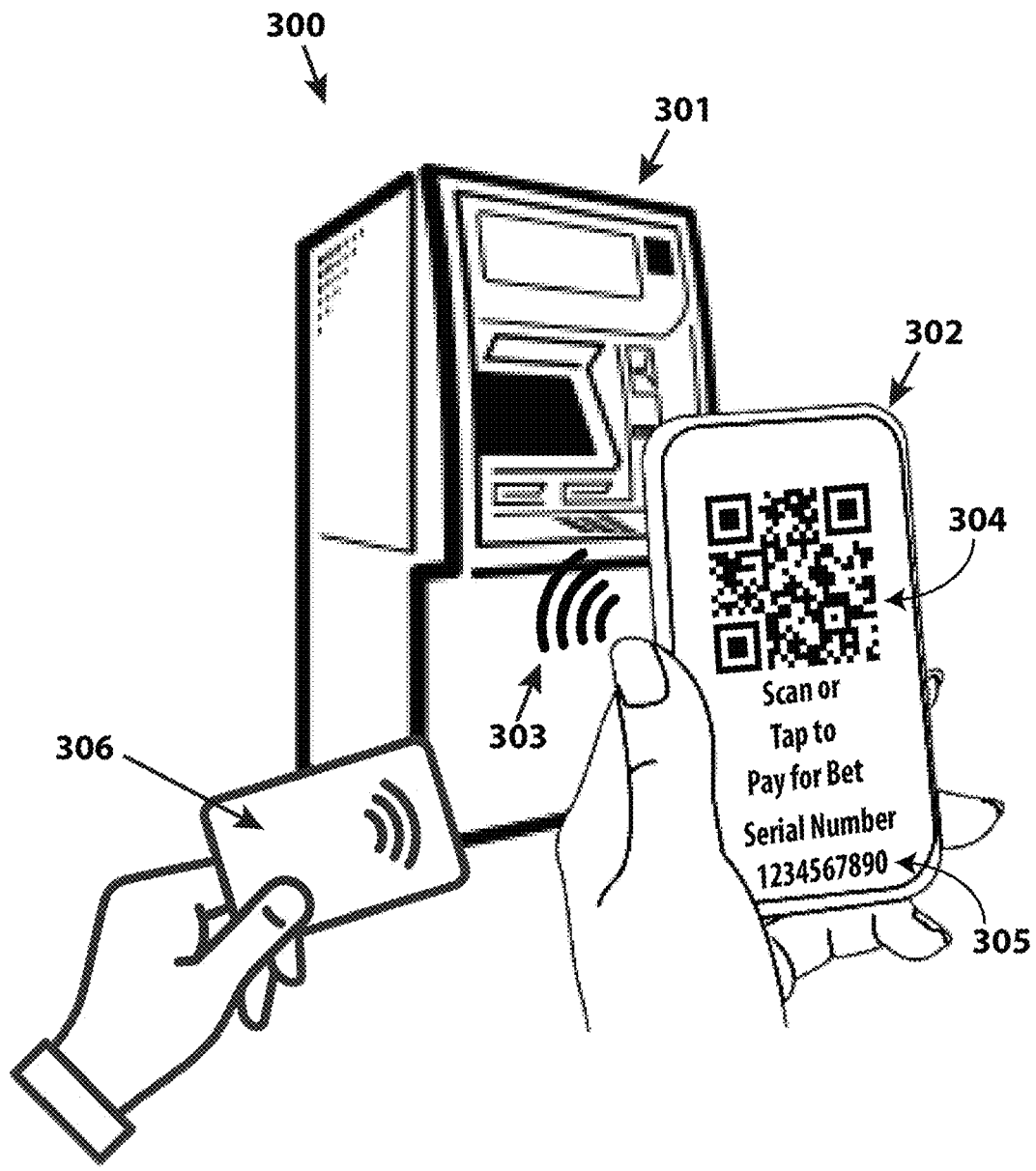
FIG. 3A is a representative example isometric view of an anonymous betting and cash-out interface system embodiment as enabled by the present invention.
Figure 3B:
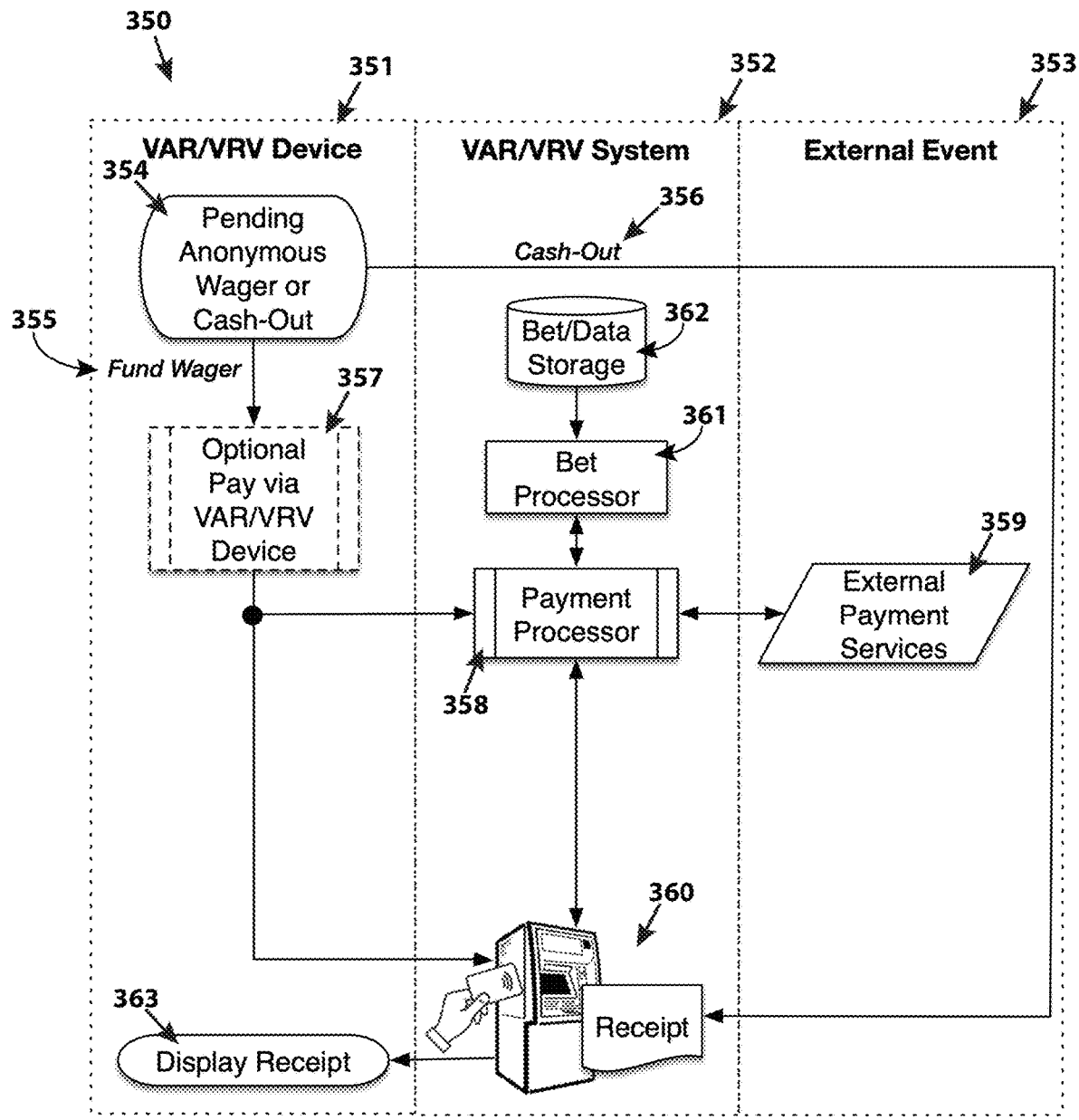
FIG. 3B is an overall swim lane flowchart representative example of the processes associated with displaying and processing the specific embodiment of FIG. 3A.

Typically for gambling embodiments, prior art systems that offer some form of digital assistance to the betting consumer require the consumer to first register with the system, thereby identifying themselves (e.g., Know Your Customer or "KYC") and at the same time establish an account where funds can be stored for future bets and winnings deposited. While the disclosed VAR and VRV embodiments of this invention can readily support registered known customers, specific embodiments of this invention also support funding and redemption of anonymous consumers, where the consumer's identity remains unknown to the system with funding and redemption conducted at existing real (i.e., brick and mortar) locations within the casino, thereby maintaining compliance with local and federal laws. FIGS. 3A and 3B, taken together, illustrate one specific embodiment enabling anonymous wager and redemption implemented as part of a VAR system. FIG. 3A provides an isometric view 300 of an anonymous betting and cash-out interface with FIG. 3B providing the associated swim lane flowchart. Of course, anonymous wager and redemption is also possible with VRV embodiments in a similar manner, assuming the VRV system is physically located where this is allowed by law (e.g., within a casino's facility). Anonymous wagering and redemption with a VRV system operating in a home location, however, is a different matter. For most home application the identity of the VRV consumer will be known, with the possible exception of home embodiments utilizing cryptocurrency (e.g., Bitcoin) as a funding and payout source in a virtual digital wallet or possibly using Near Field Communications (NFC) via a smart card, chip card, or integrated circuit card (ICC) as shown in FIG. 3A.

In the exemplary system 300 of FIG. 3A the VAR device 302 (e.g., smart phone) has either logged a pending anonymous bet and received an unique serial number from the VAR system or has won a previous anonymous wager already logged by the system. With either situation, the VAR exemplary system 300 maintains consumer anonymity by directing the consumer to take the VAR device 302 to a casino ATM 301 or a clerk station (not shown in FIG. 3A) in the casino's sports betting area. Since both the ATM 301 and clerk station are physically located on the casino grounds, an anonymous transaction embodied by the VAR device 302 is typically compliant with local and federal laws. Alternatively, the casino may issue a smart card or ICC, that transfers payments and receives winnings to/from the VAR device 302 via NFC 303.

Assuming the consumer has logged a pending bet and now needs to finalize the wager by tendering funds before the designated betting event's "no more bets" period begins, the VAR device 302 will have received an unique serial number from the VAR system that functions as a pointer on that system to the pending bet. Once the unique serial number is received by the VAR device 302, the consumer is directed to proceed to a casino ATM 301 or a clerk station (not shown in FIG. 3A) in the casino's sports betting area with a warning that the pending bet will be canceled if not tendered before the beginning of the "no more bets" period. In a preferred embodiment, the VAR application will provide a map of the casino floor illustrating where the consumer is relative to possible ATMs 301 and clerk stations. Assuming the consumer arrives at an appropriate casino ATM 301 or clerk station within the designated time period, he or she will be instructed to transfer the serial number to the ATM 301 by tapping the VAR device 302 on a receiver pad to transfer the serial number via NFC 303, or scanning a barcode 304 rendered on the VAR device's 302 screen into the ATM clerk station or, or manually entering the human readable embodiment of the serial number 305 rendered on the VAR device's 302 screen into the ATM's 301 clerk station's keypad. When the serial number is received, the ATM or clerk station will next prompt the consumer to tender cash, or a debit, or credit (assuming a credit card is legal for wagers) to culminate the bet. If the appropriate funds are received before the start of the "no more bets" period, the pending bet is logged on the VAR system as paid and finalized. When the consumer's bet is finalized, a receipt displayed on the VAR device's 302 screen and optionally physically printed on paper by the ATM 301. If the consumer arrived at a clerk station the process would essentially be the same, interacting with a human being instead of an ATM 301.

When a consumer has won a bet and wishes to cash-out his or her winnings, a similar process to the previously described wager funding is initiated. However, the "no more bets" deadline is obviously not applicable with this embodiment. To cash-out winnings, the consumer takes their VAR device 302 to a casino ATM 301 in the casino's sports betting area. In one preferred embodiment, a map of the casino floor illustrates where the consumer is relative to possible ATMs 301 and clerk stations. When the consumer arrives at an appropriate casino ATM 301, as before he or she will transfer the winning serial number to the ATM 301 or clerk station by: tapping the VAR device 302 on a receiver pad to transfer the serial number via NFC 303, scanning a barcode 304 rendered on the VAR device's 302 screen into the ATM, or manually entering the human readable embodiment of the serial number 305 on the VAR device's 302 screen into the ATM's 301 keypad or clerk station. In some embodiments, the winning serial number maybe the same unique serial number that was issued for the pending wager with an alternative embodiment issuing a different serial number for finalized bets and/or wins. Regardless of the serial number type and structure, when the serial number is received the ATM 301 or clerk station will verify the winning status with the VAR system and assuming the transaction is in good order, pays the consumer's winnings up to a predetermined threshold (e.g., $599). If the winnings exceed this threshold amount, the ATM 301 will print a receipt and instruct the consumer to go to a clerk's station or, preferably, the VAR application will instruct the consumer to proceed to a clerk station when the high-tier win was initially detected. If the consumer arrived at a clerk station with a low or mid-tier win, the redemption process would essentially be the same, interacting with a human being and a terminal instead of an ATM 301. Of course, if the consumer received a physical paper receipt when the anonymous bet was finalized, the paper receipt could also be used as a bearer document and the VAR device 302 would not be needed to cash-out.

In a preferred alternative embodiment, the casino or betting establishment issues smart cards or ICCs 306 to customers on either a known identity (e.g., hotel room keys, loyalty cards) or anonymous basis (i.e., cards are issued at a cash cage or clerk station preloaded with whatever funds the consumer provides). Typically, these smart cards or ICCs 306 would communicate with the VAR device 302 via NFC 303 either transferring the necessary funds for bets or receiving winnings via digitally signed and encrypted transactions where the card itself 306 is authenticated with the VAR system. Whenever the consumer chooses, he or she can cash out any amount stored on the card by scanning it at the cash cage, clerk station, or possibly at checkout.

The associated FIG. 3B swim lane flowcharts 350 is conceptually divided into three groups (i.e., "VAR Device" 351, "VAR System" 352, and "External Event" 353) by the three "swim lane" columns as shown in both figures. If a particular flowchart function appears completely within a swim lane, its functionality is limited to the data category of the associated swim lane.

FIG. 3B swim lane flowchart 350 begins 354 with the VAR Device 351 receiving an unique serial number for a pending bet 355 or possessing a winning bet 356. Assuming the consumer wishes to fund a pending bet 355, in an optional embodiment the consumer could fund the pending bet using the VAR Device 351 itself 357. With this optional embodiment 357, the VAR application would request permission to access existing payment applications also local to the VAR Device 351 (e.g., Apple Pay, Google Pay, Microsoft Pay, Samsung Pay) where the local payment application would interact directly with the VAR application to fund the pending bet. In an alternative optional embodiment 357, the NFC reader built into most smart phones could be utilized to read a NFC enabled debit or credit card (assuming allowed by law for gambling transactions) thereby providing funding for the pending bet. With the debit or credit card embodiments, the transaction would be completed by transmitting the EMV (Europay, MasterCard, Visa) payment tokenization packet to the Payment Processor 358 and subsequently to an External Payment Service 359.

While convenient, the optional funding embodiments 357 utilizing the VAR Device 351 as the funding vehicle may be perceived as offering only questionable anonymity, or perhaps a lower perceived security, or may not be legal in some locations or service providers. Alternatively, as disclosed in FIG. 3A, the consumer can physically proceed to a casino based ATM or clerk station 360 (FIG. 3B) to fund the pending bet. With this embodiment, the consumer would first transfer the serial number to the ATM or clerk station 360 by tapping the VAR device 351 on a receiver pad or smart card or ICC to transfer the serial number via NFC, scanning a barcode rendered on the VAR device's 351 screen, or manually keying a human readable embodiment of the serial number shown on the VAR device's 351 screen into a keypad. When the serial number and associated cash payment are received, the ATM, smart card or ICC, or clerk station 360 will transmit a message that cash was received for the associated serial number to the Payment Processor 358 which will subsequently notify the Bet Processor 361. The Bet Processor 361 will then query the Bet and Data Storage 362 database to retrieve the pending bet details and, assuming the "no more bets" period has not yet started, change the status of the bet associated with the serial number from pending to finalized. This changed status is both recorded in the Bet Storage 362 database and transferred back to the VAR device 351 where a digital receipt is displayed 363. Optionally, a physical paper receipt which could function as a bearer document for winning bets could also be printed by the ATM or clerk station 360. Embodiments where the consumer elects to pay with a debit or credit card or processed in a similar manner, with the added steps of the Payment Processor 358 receiving the EMV payment tokenization packet generated by the card transaction and verifying the card transaction with an External Payment Service 359.

When a consumer has won a bet and wishes to cash-out 356 his or her winnings, a similar process to the previously described wager funding is initiated. However, the "no more bets" deadline is obviously not applicable with this embodiment. To cash-out winnings, the consumer takes their VAR device 351 to a casino ATM or a clerk station 360 in the casino's sports betting area. When the consumer arrives at an appropriate casino ATM or a clerk station 360, as before he or she will transfer the winning serial number to the ATM 301 by either tapping the VAR device 351 on a receiver pad to transfer the serial number via NFC, or scanning a barcode rendered on the VAR device's 351 screen, or manually entering the human readable embodiment of the serial number on the VAR device's 351 screen into a keypad, etc. In some embodiments, the winning serial number maybe the same unique serial number that was issued for the pending wager with an alternative embodiment issuing a different serial number for finalized bets and/or wins. Regardless of the serial number type and structure, when the serial number is received, the ATM or a clerk station 360 verifies the winning status with the VAR system and assuming the transaction is in good order, pays the consumer's winnings up to a predetermined threshold (e.g., $599). If the winnings exceed this threshold amount, the ATM 360 will print a receipt and instruct the consumer to go to a clerk's station 360 or, preferably, the VAR application will instruct the consumer to proceed to a clerk station when the high-tier win was initially detected. Of course, if the consumer received a physical paper receipt when the anonymous bet was finalized, the paper receipt could be used as a bearer document and the VAR device 302 would not be needed to cash-out. In the preferred alternative embodiment, the casino or betting establishment issued smart card or ICC tenders both the wagering and winnings.

It should be appreciated by those skilled in the art in view of this description that various modifications and variations may be made present invention without departing from the scope and spirit of the present invention. It is intended that the present invention include such modifications and variations as come within the scope of the appended claims.

What is claimed is:

1. A method of allowing a plurality of voters to vote on at least one real world event being displayed on video displays that are potentially viewable by augmented reality (AR) devices, and monitor progress of the at least one real world event and status of votes on the at least one real world event using the AR devices, each real world event being represented by a respective video feed, the AR devices including a camera and a display screen, each AR device being operated by, and associated with, a respective voter, the method comprising:
   (a) maintaining in a database of a server that manages the votes:
      (i) a video feed of each of the at least one real world events, and
      (ii) voting data for each of the at least one real world events, the voting data including all possible votes that are available to be made for each of the at least one real world event, all votes that have been made by respective voters for each of the at least one real world event, and real time status of the votes that have been made by respective voters for each of the at least one real world events;
   (b) capturing, by the camera of one of the voter's AR device, video image frames of one of the video feeds being displayed on a video display that is in the vicinity of the voter's AR device, and electronically communicating data of the captured video image frames to the server;

(c) identifying at the server using automated video content identification software the video feed that matches the data of the captured video image frames, the video feed thereby identifying the real world event being captured by the voter's AR device, wherein the identification matching is performed by comparing segment metrics calculated from segmented video frame data of the captured video image frames to segment metrics of segmented video frame data of the video feeds;

(d) generating a first digital overlay on the display screen of the voter's AR device that is associated with the matched real world event, wherein the first digital overlay is an interactive display that allows the voter to view possible votes and enter votes regarding the real world event, wherein the voter's AR device simultaneously displays the real world event and the first digital overlay, and wherein the possible votes are obtained from the voting data in the database of the server;

(e) entering by the voter a vote on the real world event into the voter's AR device via the first digital overlay;

(f) electronically communicating the vote from the voter's AR device to the server; and (g) generating a second digital overlay on the display screen of the voter's AR device that displays real time status of the voter's vote on the real world event, wherein the real time status is obtained from the voting data in the database of the server.

2. The method of claim 1 wherein the automated video content identification software uses video-based automatic content recognition.

3. The method of claim 2 wherein the video-based automatic content recognition uses video fingerprinting or digital watermarking.

4. The method of claim 1 wherein step (g) further comprises simultaneously displaying the real world event that is associated with the voter's vote.

5. The method of claim 4 wherein the display of the real world event that appears on the display screen of the voter's AR device simultaneously with the second digital overlay is the video feed of the real world event, and not video images captured by the camera of the voter's AR device.

6. The method of claim 1 wherein steps (b) and (c) are repeated after step (f), and wherein the second digital overlay is generated only when the real world event identified in the repeated step (c) matches the real world event that the voter voted on in step (e).

7. The method of claim 1 wherein step (d) occurs in response to the voter indicating to the voter's AR device that the voter is interested in voting on the real world event being displayed on the voter's AR device, and wherein the first digital overlay persists on the display screen of the voter's AR device until the vote is entered and electronically communicated to the server.

8. The method of claim 1 wherein the display of the real world event that appears on the display screen of the voter's AR device simultaneously with the first digital overlay is the video feed of the real world event, and not video images captured by the camera of the voter's AR device.

9. The method of claim 1 wherein the data of the captured video image frames are the actual video image frames.

10. The method of claim 1 wherein there are a plurality of real world events.

11. The method of claim 1 further comprising:

(h) repeating steps (b) and (c) after step (g), and detecting whether the voter has previously voted on the identified real world event; and (i) repeating step (d) when the voter has not previously voted on the identified real world event, and repeating step (g) when the voter has previously voted on the identified real world event, thereby generating either the first digital overlay or the second digital overlay on the display screen of the voter's AR device, depending upon whether the voter has previously voted on the identified real world event.

12. The method of claim 1 wherein the segment metrics are histograms of the video image frames.

13. A system for allowing a plurality of voters to vote on at least one real world event being displayed on video displays that are potentially viewable by augmented reality (AR) devices, and monitor progress of the at least one real world event and status of votes on the at least one real world event using the AR devices, each real world event being represented by a respective video feed, the AR devices including a camera and a display screen, each AR device being operated by, and associated with, a respective voter, the system comprising:

(a) a server configured to manage the votes, the server including a database that maintains:

(i) a video feed of each of the at least one real world events, and (ii) voting data for each of the at least one real world events, the voting data including all possible votes that are available to be made for each of the at least one real world event, all votes that have been made by respective voters for each of the at least one real world event, and real time status of the votes that have been made by respective voters for each of the at least one real world events;

(b) a camera of one of the voter's AR devices configured to capture video image frames of one of the video feeds being displayed on a video display that is in the vicinity of the voter's AR device, and electronically communicate data of the captured video image frames to the server;

(c) automated video content identification software at the server configured to identify the video feed that matches the data of the captured video image frames, the video feed thereby identifying the real world event being captured by the voter's AR device, wherein the identification matching is performed by comparing segment metrics calculated from segmented video frame data of the captured video image frames to segment metrics of segmented video frame data of the video feeds;

(d) a first digital overlay generated on the display screen of the voter's AR device that is associated with the matched real world event, wherein the first digital overlay is an interactive display that allows the voter to view possible votes and enter votes regarding the real world event, wherein the voter's AR device simultaneously displays the real world event and the first digital overlay, and wherein the possible votes are obtained from the voting data in the database of the server, wherein the voter's AR device electronically communicates the entered vote from the voter's AR device to the server; and (e) a second digital overlay generated on the display screen of the voter's AR device that displays real time status of the voter's vote on the real world event, wherein the real time status is obtained from the voting data in the database of the server.

14. The system of claim 13 wherein the automated video content identification software uses video-based automatic content recognition.

15. The system of claim 14 wherein the video-based automatic content recognition uses video fingerprinting or digital watermarking.

16. The system of claim 13 wherein the display of the real world event that appears on the display screen of the voter's AR device simultaneously with the first digital overlay is the video feed of the real world event, and not video images captured by the camera of the voter's AR device.

17. The system of claim 13 wherein the data of the captured video image frames are the actual video image frames.

18. The system of claim 13 wherein there are a plurality of real world events.

19. The system of claim 13 wherein the segment metrics are histograms of the video image frames.

* * * * *